United States Patent
Okazaki et al.

(10) Patent No.: US 6,398,509 B1
(45) Date of Patent: Jun. 4, 2002

(54) LUBRICATING DEVICE

(75) Inventors: Yukiyoshi Okazaki; Taikou Nawamoto; Kenichi Sugiyama; Satoshi Dairokuno, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/522,909

(22) Filed: Mar. 10, 2000

(30) Foreign Application Priority Data

Jun. 21, 1999 (JP) .......................................... 11-174305
Aug. 4, 1999 (JP) .......................................... 11-221435
Feb. 29, 2000 (JP) ...................................... 2000-054539

(51) Int. Cl.⁷ .......................... F04B 49/06; F04B 17/00; F01M 9/00
(52) U.S. Cl. .................... 417/44.1; 322/410.1; 184/6.14
(58) Field of Search ............................. 417/44.1, 322, 417/410.1, 416, 417; 184/6.14, 6.22; 310/26

(56) References Cited

U.S. PATENT DOCUMENTS

| | | | |
|---|---|---|---|
| 3,827,409 A | * | 8/1974 | O'Neil ..................... 123/32 EA |
| 4,006,944 A | * | 2/1977 | Ando et al. ................... 308/187 |
| 4,137,997 A | | 2/1979 | Ando |
| 4,795,318 A | | 1/1989 | Cusack ......................... 417/322 |
| 4,804,314 A | | 2/1989 | Cusack ......................... 417/322 |
| 4,942,944 A | * | 7/1990 | Frey et al. ................... 184/27.1 |
| 5,297,657 A | * | 3/1994 | McConkey ................. 184/6.14 |

FOREIGN PATENT DOCUMENTS

| | | |
|---|---|---|
| EP | 0 854 314 A | 7/1998 |
| JP | 59073728 A | 4/1984 |
| JP | 2-15003 | 4/1990 |
| JP | 03009179 A | 1/1991 |
| JP | 3-222877 | 10/1991 |
| JP | 4-81565 | 3/1992 |
| JP | 5-60059 | 3/1993 |
| JP | 6-101631 | 4/1994 |
| JP | 6-197573 | 7/1994 |
| JP | 7-65695 | 7/1995 |
| JP | 9-310654 | 12/1997 |
| JP | 2000110711 A | 4/2000 |

OTHER PUBLICATIONS

Patent Abstract of Japan 05060059 Mar. 9, 1993.
Patent Abstract of Japan 06101631 Apr. 12, 1994.
Patent Abstract of Japan 06197573 Jul. 15, 1994.
Patent Abstract of Japan 09310654 Dec. 2, 1997.

* cited by examiner

*Primary Examiner*—Charles G. Freay
*Assistant Examiner*—Michael K. Gray
(74) *Attorney, Agent, or Firm*—Sughrue Mion, PLLC

(57) ABSTRACT

A rod body 30 is formed of magnetostrictive material and includes one end portion 30 fixed, and a piston 35 is fixed to the other end portion 30*b* of the rod body 30. The piston 35 is slidably disposed within a cylinder 36 in which there is formed a pump chamber 37. A suction port 39 for sucking lubricating oil into the pump chamber 37 is formed in the cylinder 36, while a suction valve 40 for preventing the lubricating oil from flowing out from the suction port 39 is disposed in the suction port 39. In the cylinder 36, there is disposed a nozzle 20 which communicates with the pump chamber 37 and has a sectional area smaller than the lubricating oil passage sectional area of the suction valve 40. There is disposed a coil 43 outside the rod body 30 and, to the coil 43, there is connected a control device 6 for controlling the supply of a current to be supplied to the coil 43.

15 Claims, 26 Drawing Sheets dcl : RETAINER INSIDE DIAMETER
Dil : INNER RACE OUTSIDE DIAMETER
H : OIL SUPPLY TARGET POSITION
$H = (dcl + Dil) / 2$ RELATIONSHIP OF NOZZLE DISCHARGE INSIDE DIAMETER WITH RESPECT TO DISCHARGE SPEED AND DISCHARGE OIL QUANTITY RELATIONSHIP BETWEEN
L/d⁴ AND DISCHARGE SPEED RELATIONSHIP BETWEEN
L/d⁴ AND DISCHARGE OIL QUANTITY

RELATIONSHIP BETWEEN SHAFT ROTATION
SPEED AND BEARING TORQUE

- ♦ OIL – AIR LUBRICATION : 0.01125cc / min
- ■ SUPER FINE QUANTITY OIL LUBRICATION : 0.012cc / min
- ▲ SUPER FINE QUANTITY OIL LUBRICATION : 0.003cc / min
- ✕ SUPER FINE QUANTITY OIL LUBRICATION : 0.12cc / min

RELASIONSHIP BETWEEN SHAFT ROTATION
SPEED AND OUTER RACE TEMPERATURE INCREASE

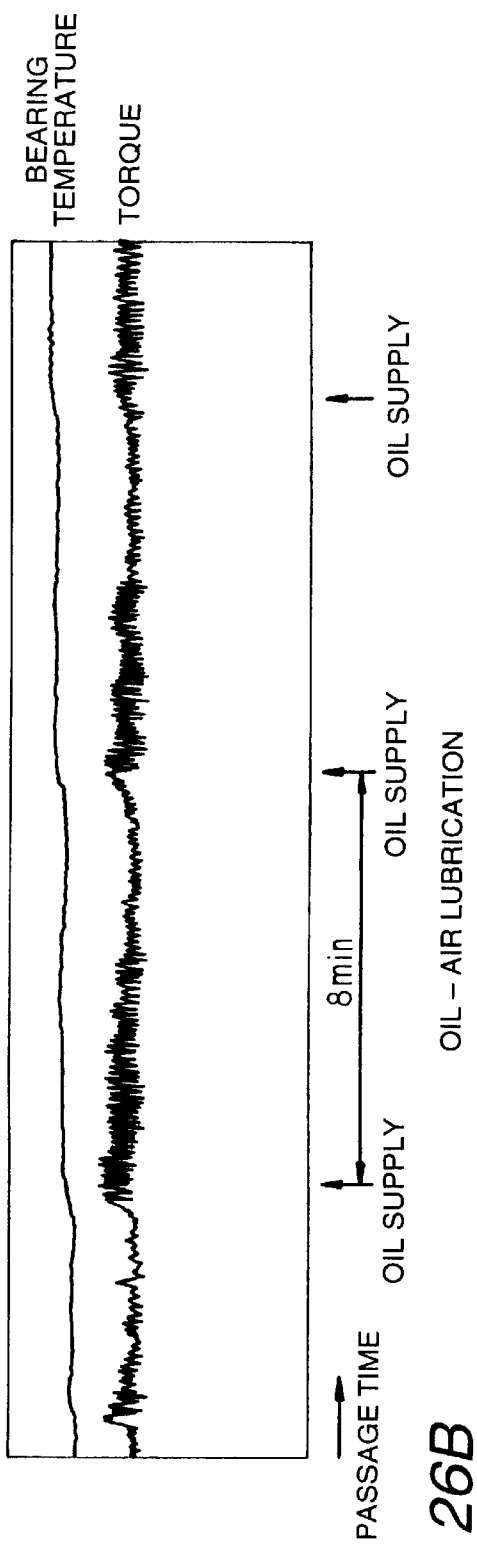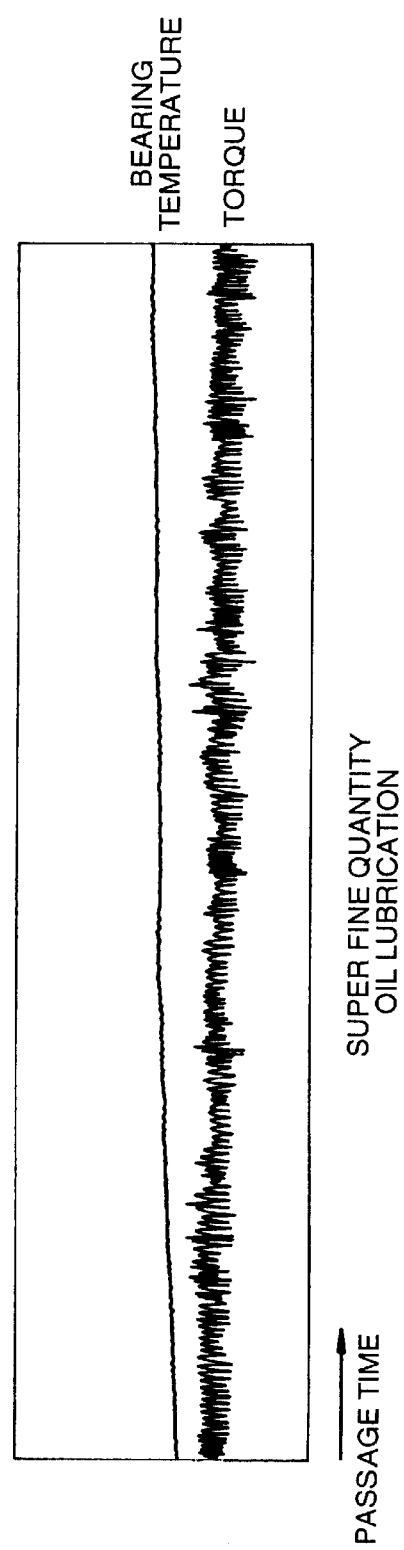
FIG. 26A
FIG. 26B

LUBRICATING DEVICE

BACKGROUND OF THE INVENTION

1. Field of the Invention

The present invention relates to a lubricating device which discharges lubricating oil to a spindle apparatus provided in various high-speed rotary machines such as a machine tool and, especially, to the bearing of the spindle.

2. Description of the Related Art

Conventionally, in lubricating the bearing of a high-speed rotary spindle, normally, there are used lubricating devices of various types such as an oil mist type, an oil-air type, and a jet type.

The lubricating device of an oil mist type comprises an oil tank, a pump, a plunger, a pressure divider, compressed air, an electromagnetic valve, and a nozzle; and, in this device, lubricating oil is turned into a fine mist-like form, it is delivered through an air pipe using the compressed air, and it is jetted out to the interior portion of the bearing.

The lubricating device of an oil-air type comprises an oil tank, a pump, a distributor, a compressed air source, a plunger, and a nozzle; and, in this device, lubricating oil drops (0.01–0.03 cc) adjusted to a given quantity by the mechanical mechanism of the plunger is discharged into an air pipe, is delivered up to the nozzle by the compressed air, and is jetted out to the interior portion of the bearing.

The lubricating device of a jet type is a device which does not use the air source but turns lubricating oil into high pressure one using a high-pressure pump and jets out the high-pressure lubricating oil at a high speed into the interior portion of the bearing from a nozzle of which discharge diameter is narrowed.

By the way, while a current trend requests an increase in the rotation speed of the spindle device, in the lubricating devices of various types used for lubrication of the spindle device, there are found the following problems:

Firstly, in the lubricating device of an oil mist type, due to use of the compressed air, not only there arises a noise problem but also the mist-like lubricating oil scatters into the air to worsen an operation environment. Also, because of the scattering of the mist-like lubricating oil into the air, the quantity of lubricating oil to be supplied to the interior portion of the bearing is indefinite. Especially, in case where the bearing is rotated at a high speed, due to the effect of an air curtain, when dm·N is equal to or larger than 2000000 (dm expresses the pitch circle diameter of the bearing, and N expresses the rotation speed (rpm) of the bearing), the lubricating oil can be little supplied to the interior portion of the bearing, thereby raising a fear that the bearing can cause seizure.

In the lubricating device of an oil-air type, similarly to the-above-mentioned oil mist type lubricating device, since the compressed air is used, not only there arises a noise problem but also the mist-like lubricating oil scatters into the air to thereby worsen the operation environment. Also, in the high-speed rotation of the bearing, as the result of the rotation of the spindle, there is produced an air curtain. Therefore, similarly, the lubricating oil can be little supplied to the interior portion of the bearing, thereby raising a fear that the bearing can cause seizure.

Also, in the lubricating device of an oil-air type, because it is difficult to supply a fine amount of lubricating oil continuously and stably, the lubricating oil must be supplied intermittently and thus the lubricating oil is supplied at a given quantity (normally, in the range of 0.01–0.03 cc) every given interval time (normally, in the rage of 8–16 min.) into the air pipe. Therefore, since the quantity of lubricating oil to be supplied to the interior portion of the bearing varies every given time, the lubricating condition of the interior portion of the bearing varies all the time and, especially, just after the lubricating oil is supplied, a large quantity of lubricating oil enters the interior portion of the bearing, thereby causing a phenomenon that the torque of the bearing and the temperature of the bearing can vary. There is a fear that this phenomenon can have ill effects on the working precision of a machine tool.

On the other hand, in a lubricating device of a jet type, when compared with the above lubricating devices of oil mist and oil-air types, there is little found the effect of the above-mentioned air curtain but, not only because there is required an attendant device such as a high-pressure pump but also because the quantity of lubricating oil to be supplied to the bearing increases to thereby increase drag resistance, there is necessary a large motor which is used to drive the spindle, which results in the increased cost.

As a device which has solved the difficulty in the above-mentioned fine quantity adjustment of a lubricant, there are known devices which are respectively disclosed in the following patent publications.

That is, in Japanese Patent Examined Publication No. 2-15003 of Heisei, there is disclosed a device for supplying a fine fixed quantity of liquid. In this supply device, a piezo-electric element is used to allow the fine quantity adjustment of the liquid and a lubricant is delivered to a nozzle by compressed air.

In a flow control valve disclosed in Japanese Patent Examined Publication No. 7-65695, a diaphragm is disposed in one end of a magnetostrictive element and an orifice is adjusted by the expansion and contraction of the magnetostrictive element to thereby adjust the flow quantity and pressure of fluid.

In a giant magnetostrictive material pump disclosed in Japanese Patent Unexamined Publication No. 3-222877 of Heisei, the displacement of a giant magnetostrictive material is enlarged by a lever, and a diaphragm is driven by the lever to turn the pressure of the interior portion of the pump into a negative pressure or a positive pressure, thereby sucking or discharging a fluid.

In a magnetic precision pump (Magnetostrictive Pump) disclosed in U.S. Pat. Nos. 4,795,318 and 4,804,314, in the interior portion of a cylinder, there is disposed a piston which is formed of a magnetostrictive material and a voltage is applied to a coil, which is disposed in such a manner that it encloses the piston, to thereby expand and contract the piston so as to discharge a fluid in the interior portion of the cylinder.

In a giant magnetostrictive material type injection pump disclosed in Japanese Patent Unexamined Publication No. 4-81565 of Heisei, a needle valve is opened and closed by a giant magnetostrictive material to thereby inject a fixed quantity of high-pressure liquid.

However, in the above-mentioned pump using a giant magnetostrictive material or flow control valve, there are found the following problems.

The fine fixed quantity liquid supply device disclosed in Japanese Patent Examined Publication No. 2-15003 of Heisei has not solved yet a drawback caused by delivering the lubricant to the nozzle using the high-pressure air.

In the flow control valve disclosed in Japanese Patent Examined Publication No. 7-65695, the diaphragm area, to which the pressure of the liquid is applied, is larger than the sectional area of the giant magnetostrictive material and the liquid pressure is smaller than the pressure of the giant magnetostrictive material In the giant magnetostrictive material pump disclosed in Japanese Patent Unexamined Publication No. 3-222877 of Heisei, since the displacement is enlarged by the lever, the liquid pressure is smaller than the pressure of the giant magnetostrictive material. The output of the giant magnetostrictive material increases as a magnetic field by a coil is increased. However, in case where the coil magnetic field is increased, the required volume of the coil increases accordingly. As a result of this, a device using such coil increases in size.

In the magnetic precision pump disclosed in U.S. Pat. Nos. 4,795,318 and 4,804,314, since the piston itself is made of a drive element, the pressure of the lubricant cannot be made larger than the pressure of the giant magnetostrictive material.

The giant magnetostrictive material type injection pump disclosed in Japanese Patent Unexamined Publication No. 4-81565 of Heisei does not have a function to turn the pressure of the liquid into high pressure.

SUMMARY OF THE INVENTION

The present invention aims at eliminating the drawbacks found in the above-mentioned circumstances. Accordingly, it is an object of the invention to provide a lubricating device which injects a high-precision set fine quantity of lubricant onto the lubricating surface of a rotary body at a high speed to thereby minimize an increase in torque and bearing temperature so as to be able not only to provide high torque stability and reduce the generation of noises but also to reduce the size and cost thereof, and a spindle apparatus using such lubricating device.

In attaining the above object, according to the invention, there is provided a spindle apparatus comprising a shaft, at least two bearings disposed spaced apart from the shaft in the axial direction of the shaft, each of the bearings having an inner race fitted with the shaft, and a housing fitted with the outer races of the bearings, with the inner races and outer races of the bearings being rotatable with respect to each other with rolling elements between them, the spindle apparatus further including: a lubricating device for supplying lubricating oil to the bearings at a discharge speed in the range of 10 m/sec.–100 m/sec. and in a fine discharge oil quantity in the range of 0.0005 cc/shot–0.01 cc/shot.

According to the above structure, since the discharge speed of the lubricating oil to be discharged from the nozzle is high, that is, 10 m/sec–100 m/sec., the lubricating oil can be supplied to the interior portion of the bearing positively without being influenced by an air curtain which can occur in the high-speed rotation. Also, because the discharge quantity of the lubricating oil is fine, that is, in the range of 0.0005 cc/shot–0.01 cc/shot, an increase in the temperatures of the bearings can be controlled down to a low level. Further, since there are not used attendant devices including a high-pressure pump such as a jet type, there is eliminated an increase in drag resistance which could be caused due to an increase in the quantity of the oil supplied to the bearings, so that, as a motor for driving the spindle, there can be used a motor which is inexpensive and compact.

Also, in addition to the above structure, there may be disposed a shaft rotation speed detector (tachometer) for detecting the shaft rotation speed. In this case, by controlling the supply interval and supply quantity of the lubricating oil discharged from the lubricating device based on the detect results of the shaft rotation speed detector (tachometer), a proper oil quantity of lubrication is possible with respect to the spindle rotation regardless of the spindle rotation speed, so that an ideal lubricating condition can be always obtained in the interior portion of the bearing. Also, the increase in the bearing temperature can also be controlled down to a further lower level. Further, since the lubricating oil is supplied to the interior portion of the bearing positively, a lubricating oil supply efficiency can be enhanced and the lubricating oil consumption can be reduced. Moreover, since compressed air supplied by a compressor is not used as in the lubricating device of an oil mist system or an oil-air system, the noise level is low and the oil mist can be little produced.

And, in addition to the above structure, there may be disposed a lubricating oil filter, an air bleeder sensor, and a clogging detect pressure sensor. In this case, there can be avoided troubles such as a clogged condition.

By the way, the oil supply quantity to the interior portion of the bearing, in case where $d_m \cdot N$ is equal to or larger than 1000000, preferably; may be in the range of 0.0005 cc/min.–0.12 cc/min., and, more preferably, in the range of 0.003 cc/min.–0.12 cc/min.

Also, the inside diameter of the nozzle outlet, preferably, may be in the range of 0.08 mm–0.6 mm and, more preferably, in the range of 0.1 mm–0.5 mm.

Further, a ratio of the length L (mm) of the pipe up to the nozzle to the pipe diameter d (mm), preferably, may be $5 \leq L/d^4 \leq 12000$ mm$^{-3}$, and, more preferably, $5 \leq L/d^4 \leq 10000$ mm$^{-3}$.

Still further, according to another aspect of the invention, there is provided a lubricating device which uses magnetostrictive pump including a pump chamber for pressurizing lubricant by means of the expanding and contracting operations of a rod body formed of magnetostrictive material to be executed by applying a magnetic field to the rod body and removing the magnetic field therefrom, thereby discharging the pressurized lubricant, the lubricating device comprising: a check valve disposed in the intermediate portion of a flow passage for supplying the lubricant to the magnetostrictive pump to prevent the lubricant from flowing out from the magnetostrictive pump, and a nozzle disposed on the lubricating discharge side of the magnetostrictive pump and having a flow passage sectional area smaller than the lubricant flow passage sectional area of the check valve.

According to the present lubricating device, the rod body can be expanded due to the application of the magnetic field, and the lubricant within the magnetostrictive pump can be thereby compressed. Due to the compression of the lubricant, the pressure of the flow passage for supplying the lubricant is increased, the check valves closed, and the lubricant is discharged externally at a high speed from the nozzle. In case where the magnetic field application is cut off, the rod body is contracted to thereby increase the internal capacity of the pump, so that the lubricant is supplied into the pump through the check valve. In this operation, the air also flows in from the leading end of the nozzle. However, since the flow-in quantity ratio of the lubricant to the air is proportional to the square of the flow passage sectional area ratio of the check valve to the nozzle, the flow-in quantity of the lubricant becomes larger than that of the air, so that, in the next operation as well, the lubricant can be discharged similarly.

Further, according to the above lubricating device, the one end side of the rod body is fixed, a piston is connected to the other end side of the rod body, and the piston is slidably disposed within a cylinder to thereby form a pump chamber, while the cross sectional area of the inner surface of the cylinder is set smaller than the cross sectional area of the rod body.

In the present lubricating device, due to the expansion and contraction of the rod body, the piston within the cylinder is moved to thereby form the pump. And, the pressure of the lubricant within the cylinder is higher than the pressure generated by the rod body, which makes it possible to discharge the lubricant at a high speed.

Also, in the lubricating device, the decreased area of the pump chamber due to the expansion of the rod body is set equal to the sum of the quantity of the air flowing in from the nozzle when the rod body is contracted, a decreased volume due to compression of the lubricant that is present within the internal capacity between the check valve and the outlet of the nozzle, the increased capacity of the internal capacity due to the pressure deformation of parts forming the internal capacity, and a required discharge quantity of lubricant.

In the lubricating device, the magnetic field to be applied to the rod body is controlled while correcting it using values with variable elements taken into account, while the variable elements respectively relate to the quantity of air flowing in from the nozzle, the decreased volume due to the compression of the lubricant, and the increased capacity of the internal capacity due to the pressure deformation of parts forming the internal capacity This can avoid a discharge quantity error which could otherwise be caused by the variable elements, so that a desired discharge quantity can be obtained with high accuracy.

Further, in the lubricating device, the magnetostrictive pump includes a coil for applying a magnetic field and a control device for controlling a current to be supplied to the coil to thereby expand and contract the rod body; and, the control device, in the initial excitation stage of the coil, supplies a current until the lubricant within the pump chamber reaches such a pressure as to allow the magnetostrictive pump to obtain a desired discharge speed, after reaching this pressure, supplies a current for maintaining the pressure of the lubricant constant according to the discharge quantity of the lubricant, and further, after a desired lubricant discharge quantity is obtained, cuts off the supply current.

According to the present lubricating device, when the current is supplied to the coil from the control device, the rod body is expanded to thereby allow the piston to compress the lubricant within the pump chamber. As a result of this, the pressure within the cylinder is increased, the suction valve is closed, and the lubricant is thereby discharged externally at a high speed from the nozzle. At the then time, the control device, for example, in the initial excitation stage of the coil, supplies a current to the coil until the current reaches such a current value for the magnetostrictive pump as to be able to obtain a desired discharge speed, that is, the control device raises the current up to this current value quickly. During this, a high voltage is applied to the coil to thereby raise the current quickly against the time constant of the coil. And, after reaching the current value to be able to obtain the desired discharge speed, in order to maintain the pressure of the lubricant which decreases according to the discharge quantity of the lubricant constant, the control device supplies the current in such a manner that the capacity of the cylinder decreases by a capacity equal to the discharge quantity of the lubricant. During this, due to the time constant of the coil, the voltage is switched over to a voltage which can obtain a desired current increasing speed. Next, after the desired lubricant discharge quantity is obtained, the supply current to the coil is cut off. Thanks to this, a required lubricant pressure can be obtained in and from the early discharge stage of the lubricant and, after the start of discharge of the lubricant, the discharge speed can be maintained constant, so that the discharge of the lubricant can be carried out accurately and stably. Also, when the current is cut off, the rod body is contracted to thereby increase the internal capacity of the pump chamber, so that the lubricant can be supplied into the pump chamber through the suction valve.

Also, the above lubricating device further includes a measuring device for measuring any one of the value of a current to be supplied to the coil, a voltage value proportional to this current, and the value of a magnetic flux caused by this current; and, an abnormal condition judging device for comparing a measured value with respect to an elapsed time measured by the measuring device with a measured value in a normal condition time to thereby judge whether an abnormal condition has occurred or not, whereby, when the abnormal condition judging device judges that an abnormal condition has occurred, the lubricating device issues an abnormal signal.

According to the present lubricant device, for example, assuming that a target to be measured is a current value, in case where a current value measured at the time when a certain time has passed after the start of the supply of a current is larger than a current value (a design value) in a normal operation time, that is, in case where a time required for a current to increase up to a certain current value is shorter than a design value, it can be judged that an abnormal condition such as the clogged condition of the nozzle has occurred. On the other hand, in case where the current value measured at the time when a certain time has passed after the start of the supply of the current is smaller than the design value, that is, in case where the time required for the current to increase up to a certain current value is longer than the design value, it can be judged that an abnormal condition such as lubricant leakage has occurred. Also, assuming that the target to be measured is a voltage value or a magnetic flux value, an abnormal condition can be judged similarly. And, by issuing the abnormal signal at the time when the abnormal condition occurs, feedback control can be carried out, for example, the operation of the supply target of the lubricant can be stopped.

Further, the above-mentioned lubricating device further includes a measuring device for measuring any one of the value of a current to be supplied to the coil, a voltage value proportional to this current, and the value of a magnetic flux caused by this current; and, an air mixture judging device for comparing a measured value with respect to an elapsed time measured by the measuring device with a measured value in an air non-mixture time to thereby judge whether the air is mixed or not, whereby, in the start of the operation of the lubricant device, until the air mixture judging device judges that the air is not mixed, the lubricant device increases the current to be supplied to the coil or increases the supply frequency of the current.

According to the present lubricating device, assuming that the target to be measured is a current, in case where the air is mixed into the lubricant, the rising time of the current to be measured is long, which makes it possible to judge the presence or absence of the mixed air. Also, assuming that the target to be measured is a voltage value or a magnetic flux value, an abnormal condition can be judged similarly. And, in the start of the operation of the lubricating device, until it is judged that the mixed air is not present, by increasing the current to be supplied to the coil or by increasing the supply frequency of the current, or by increasing both the current and the supply frequency of the current, the discharge quantity and discharge cycle of the magnetostrictive pump can be increased, so that the lubricant can be quickly sucked into the pump from the tank and the air bleed can be completed in a short time.

To sum up the above facts, by using the super fine quantity oil lubricating system, a lubricating oil forced circulating device, a heat exchanger, a lubricating oil collecting device, and other attendant devices such as compressed air, which are used in the conventional lubricating systems such as a lubricating system of an oil mist, a lubricating system of an oil-air type and a lubricating system of a jet type, can be simplified; the noise level can be controlled down to a low level, which can be consideration for environment. And, the consumption of the lubricating oil can be reduced, the bearing torque can be enhanced in stability, and the bearing temperature increase can be controlled down to a low level, thereby being able to enhance the rotation accuracy of the spindle Therefore, according to the present invention, there can be provided a spindle apparatus which is more advantageous than the conventional spindle apparatus using the related lubricating methods.

BRIEF DESCRIPTION OF THE DRAWINGS

FIGS. 26A and 26B are graphical representations of the results obtained when the transitions of the bearing torque are checked;

DETAILED DESCRIPTION OF THE PREFERRED EMBODIMENTS OF THE INVENTION

Now, a description will be given below in detail of the preferred embodiments of a spindle apparatus according to the invention with reference to the accompanying drawings.

First Embodiment

Figure 1:
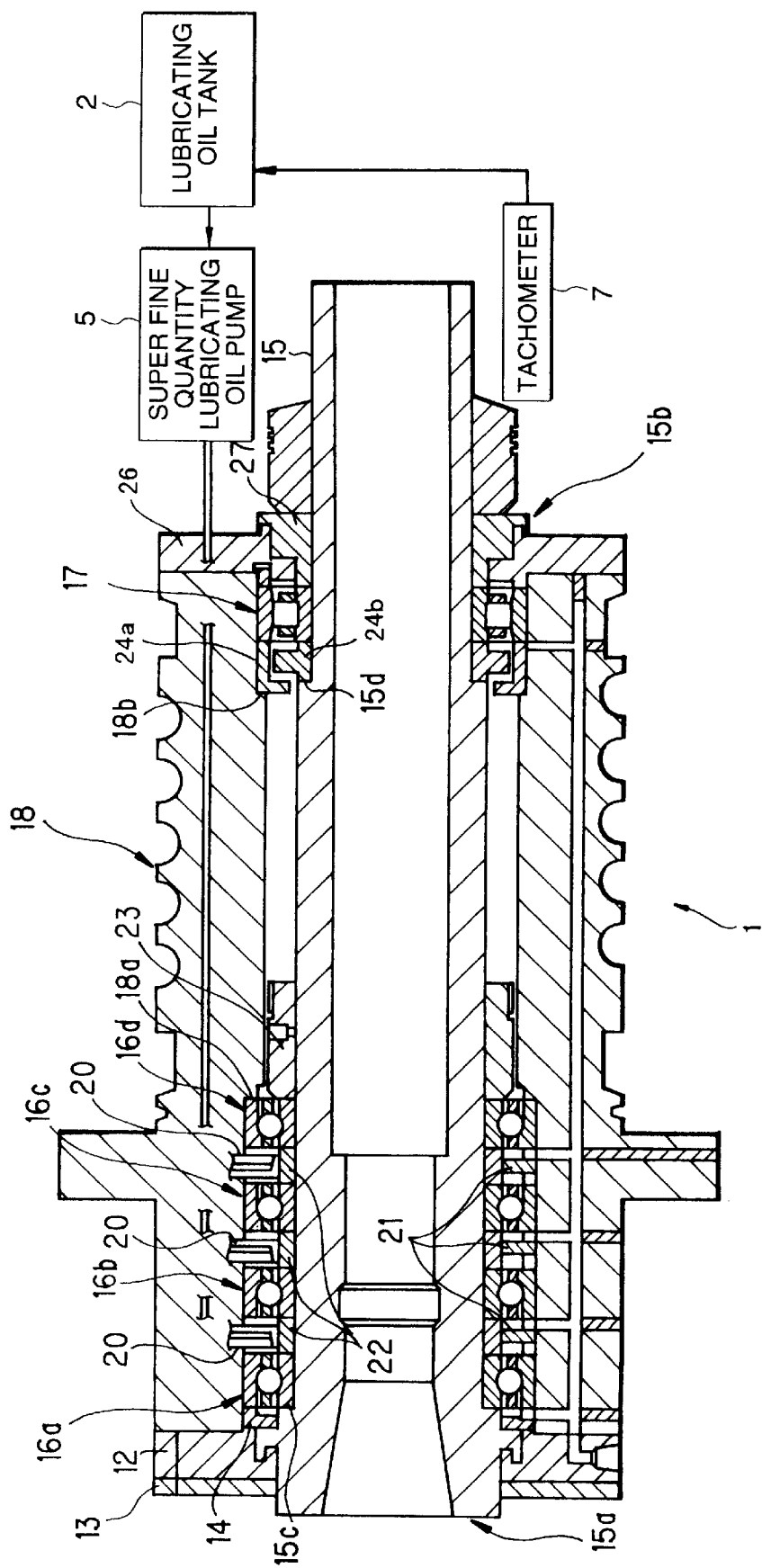
FIG. 1 is a section view of the internal structure of a spindle apparatus according to a first embodiment of the invention.
Figure 2:
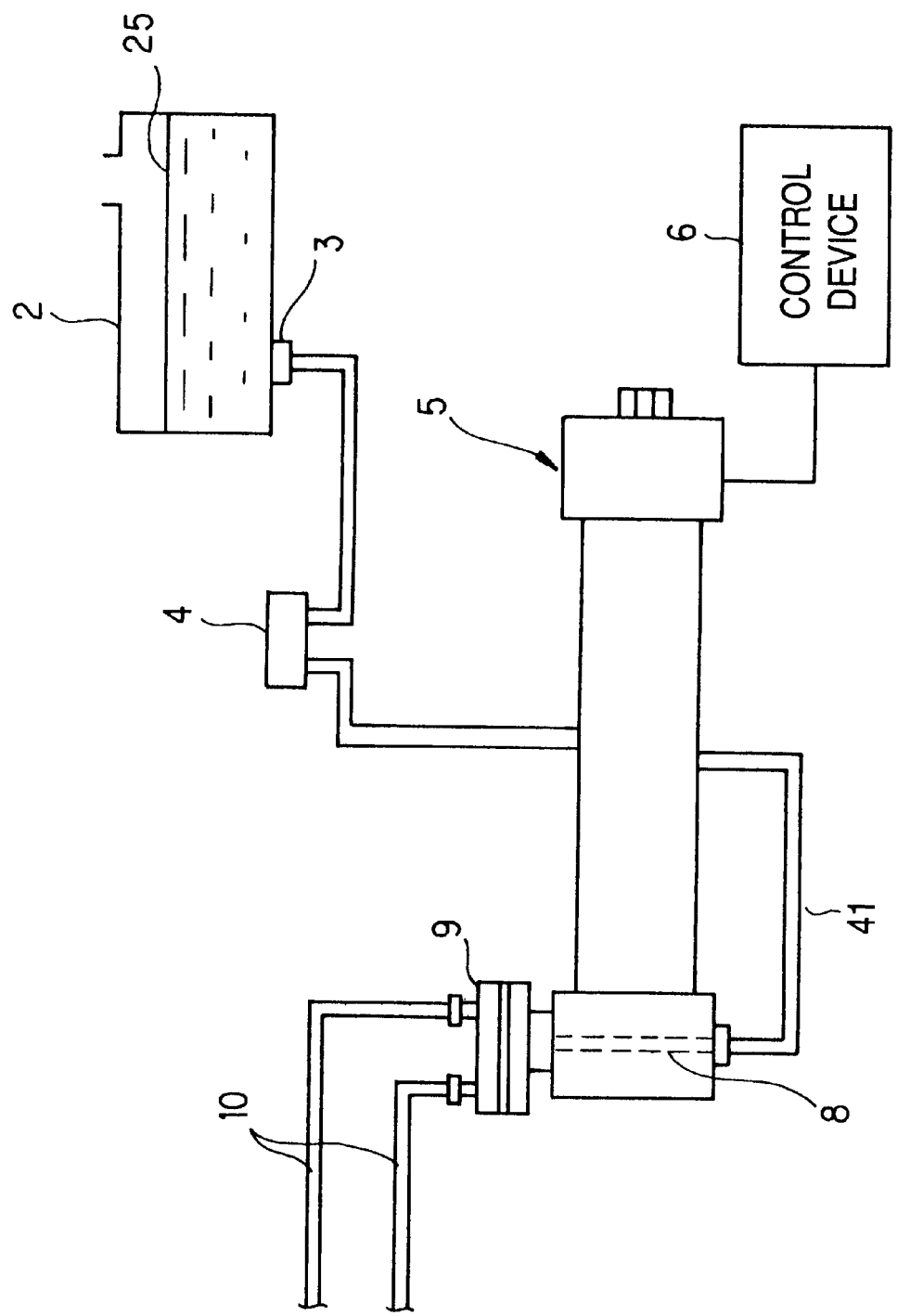
FIG. 2 is a structure view of a lubricating unit employed in the spindle apparatus.

FIGS. 1 and 2 show the structure of a spindle apparatus according to a first embodiment of the invention. The spindle apparatus 1 comprises bearings for spindle 16*a*, 16*b*, 16*c*, 16*d* and 17 respectively shown in FIG. 1 as well as a lubricating oil tank 2, a lubricating oil filter 3, an air bleed device 4, a super fine quantity lubricating oil pump 5, a control device 6 for controlling the super fine quantity lubricating oil pump 5, a clogging sensor (a pressure sensor) 8, a multi-branch piping device 9, and a pipe 10, respectively shown in FIG. 2 and a tachometer 7 (see FIG. 1).

FIG. 1 is a longitudinal section view of the internal structure of the spindle apparatus 1. As shown in FIG. 1, the spindle apparatus 1 comprises a plurality of angular ball bearings 16*a*, 16*b*, 16*c* and 16*d* respectively used to support the front portion 15*a* of a spindle 15 horizontally in a freely rotatable manner, a cylindrical roller bearing 17 for supporting the rear portion 15*b* of the spindle 15, and a housing 18 for covering the respective outside portions of these bearings 16*a*, 16*b*, 16*c*, 16*d* and 17. By the way, on a front cover 12, there is mounted a cover 13.

Of the plurality of angular ball bearings, the outer race of the rear-most bearing 16d is secured to the inside diameter stepped portion 18a of the housing 18, while the outer race of the front-most bearing 16a is secured to the front cover 12 through an outer race holder 14. Also, between the respective outer races of the angular ball bearings 16a, 16b, 16c and 16d, there -are interposed cylindrical-shaped outer race spacers 21 respectively. In this manner, the respective outer races of the angular ball bearings 16a, 16b, 16c and 16d are fixed to the inner peripheral surface of the housing 18.

Referring now to the inner races of the angular ball bearings 16a, 16b, 16c and 16d, the front end of the inner race of the front-most bearing 16a is secured to the outside diameter stepped portion 15c of the spindle 15. Between the inner races of the angular ball bearings 16a, 16b, 16c and 16d, there are interposed cylindrical-shaped inner race spacers 22 respectively, while the rear end of the inner race of the rear-most bearing 16d is secured to a hold ring 23 fitted with the spindle 15 and is pressed forwardly (in FIG. 1, to the left) in the axial direction thereof. The respective inner races of the angular ball bearings 16a, 16b, 16c and 16d are fixed to the outside diameter surface of the spindle 15 in such a manner that they can be rotated integrally therewith. By the way, although the spindle 15 in the present embodiment is supported horizontally, for example, when it is used in a machining center, it can be used in such a manner that it is supported vertically or inclinedly.

The front end of the outer race of the cylindrical roller bearing 17 is secured to the inside diameter stepped portion 18b of the housing 18 through the outer race spacer 24a, while the rear end of the outer race is secured to a rear cover 26 and is fixed to the inner peripheral surface of the housing 18. Also, the front end of the inner race is secured to the outside stepped portion 15d of the spindle 15 through the inner race spacer 24b, while the rear end thereof is secured to a hold ring 27 fitted with the spindle 15 and is pressed forwardly in the axial direction thereof. The inner race of the cylindrical roller bearing 17 is fixed to the outside diameter surface of the spindle 15 in such a manner that it can be rotated integrally therewith.

To the angular ball bearings 16a, 16b, 16c and 16d as well as to the cylindrical roller bearing 17, there is supplied lubricating oil from the super fine quantity oil lubricating pump 5 through nozzles 20 which are respectively mounted within the housing 18. The respective nozzles 20 are disposed in the interior portion of the housing 18, and are fixed in such a manner that they are inserted through mounting holes extending through the respective outer race spacers 21 from the outside diameter surface. Also, the leading ends of the respective nozzles 20 extend through the outer race spacers 21 and project into a clearance space formed between the inner race spacers 22 and inter-outer-race seats 21. In the present embodiment, there are disposed three nozzles 20 for each bearing. However, the number of nozzles 20 is not limited.

Next, description will be given below of the operation of the spindle apparatus 1 with reference to FIGS. 1 and 2.

Lubricating oil 25, which is filled into the lubricating oil tank 2, flows through the lubricating oil filter 3 and the air bleed device 4 into the super fine quantity oil lubricating pump 5. The super fine quantity oil lubricating pump 5 is controlled by the control device 6 for an intermittent time adjustment, a lubricating oil quantity adjustment, and a multi-branch piping mechanism respectively for supply of the lubricating oil, so that the super fine quantity oil lubricating pump 5 allows the multi-branch piping device 9 to feed the lubricating oil 25 to the respective pipes 10. Also, the number of pipes 10 is not limited to the number of bearings. when the number of pipes is equal to the number of bearings, the control device 6 is used to control the flow quantity of the lubricating oil flowing into the individual pipes 10 and the oil discharging intervals, thereby adjusting the quantity of the lubricating oil to be supplied to the bearings. By the way, in case where the lubricating oil is supplied to five pipes 10 in a quantity of 0.002 cc/shot at 2-second intervals from the super fine quantity oil lubricating pump 5 to thereby lubricate five bearings, the lubricating oil is supplied in a quantity of 0.002 cc to each of the five bearings at 10-second intervals.

Also, the quantity of the lubricating oil to be supplied to the bearings and the oil supply intervals may also be changed for every bearings and the lubricating oil may be supplied from some or all of the pipes. Further, when the number of pipes is larger than the number of bearings, the quantity of the lubricating oil to be supplied to the bearings is set equal to the sum of the pipes that are connected to the bearings. Also, when the number of pipes is smaller than the number of bearings, the pipes are made to branch from their intermediate portions and then the lubricating oil is supplied to the bearings through the branching portions of the pipes.

The lubricating oil 25, which is fed to the respective pipes 10, is positively supplied from the nozzles 20 into the interior portions of the spindle bearings 16a, 16b, 16c, 16d, and 17. In this case, the respective nozzles 20 are adjusted to the optimum angles and positions, so that a proper quantity of the lubricating oil 25 can be supplied into the interior portions of the bearings for spindle 16a, 16b, 16c, 16d, and 17. Also, the intermittent time adjustment and lubricating oil quantity adjustment are made in accordance with the output of the tachometer 7 for detection of the rotation speed of the spindle. By the way, the lubricating oil quantity can also be adjusted using a flow sensor of a super fine quantity type.

In supplying the lubricating oil, the lubricating oil filter 3 removes dust which gives rise to a clogged condition. However, in case where dust is mixed into the lubricating oil for some reason or other to thereby cause a clogged condition, that is, in case where the lubricating oil is not supplied normally for some reason or other to thereby cause an abnormal discharge, the clogging sensor (pressure sensor) 8 is actuated to thereby avoid the occurrence of a trouble. Also, in case where the air is mixed, the air bleed device 4, which is formed of porous material, removes the mixed air.

Next, description will be given below of the super fine quantity oil lubricating pump 5.

Figure 3:
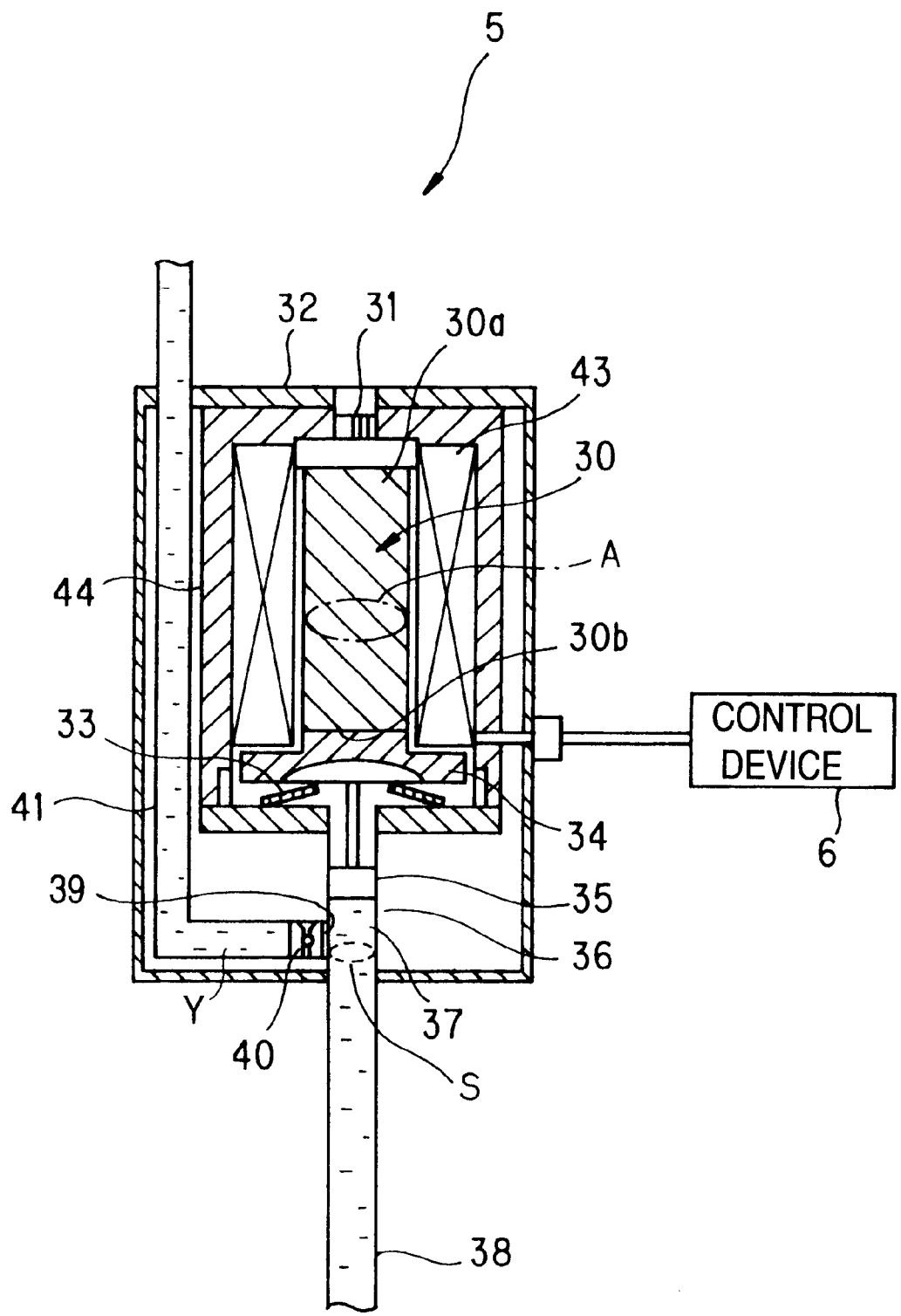
FIG. 3 is a section view showing a super fine quantity lubricating oil pump.

FIG. 3 is a section view of the super fine quantity oil lubricating pump 5. As shown in FIG. 3, there is disposed a rod body 30 which is made of giant magnetostrictive material having a positive characteristic, and one end portion 30a of the rod body 30 in the axial direction thereof is fixed to a case 32 through a preload adjust mechanism 31. As the giant magnetostrictive material of the rod body 30, for example, there can be suitably used material having a trade name Terfenol-D manufactured by Edge Technologies Co. (ETREMA division), or magnetostrictive material manufactured by TDK Co. When a magnetic field is applied to the rod body 30 by a coil (which will be discussed later) disposed coaxially therewith, the rod body 30 is expanded in the axial direction thereof due to a magnetostrictive phenomenon (Joule effect).

The preload adjust mechanism 31 may provide, for example, a screw mechanism which, when it is rotated, can project in the axial direction of the rod body 30 to press against one end portion 30a of the rod body 30. In the other end portion 30b of the rod body 30 in the axial direction thereof, there is disposed a pressure transmission member 34 which can energize the rod body 30 to the preload adjust mechanism 31 side by a belleville spring 33 to transmit the pressure without producing a clearance with respect to the axial direction of the rod body 30, while the rod body 30 is connected to a piston 35 through the pressure transmission member 34. The piston 35 is slidably disposed in the interior portion of a cylinder 36. The cylinder 36 is formed in such a manner that the transverse area S of its piston sliding space in a direction extending at right angles to the axial direction thereof is set smaller than the transverse area A of the rod body 30 in a direction extending at right angles to the axial direction thereof; and, in the interior portion of the cylinder 36, there is formed a pump chamber 37. The cylinder 36 is connected through a pipe 38 to the clogging sensor 8 (see FIG. 2). Here, although a check valve is not interposed between the pump chamber 37 and clogging sensor 8, the check valve may also be provided.

Also, in the cylinder 36, there is formed a suction port 39 which is used to suck the lubricating oil 25 into the pump chamber 37. In the suction port 39, there is disposed a suction valve 40; and, the suction valve 40 provides a check valve which prevents the lubricating oil 25 from flowing externally of the pump chamber 37. Also, the flow passage sectional area Y of the suction valve 40 is set larger than the sectional area of the discharge opening 20a of the nozzle 20 enlargedly shown in FIG. 4, while the suction port 39 is pipe connected through a lubricating oil delivery pipe 41 to the lubricating oil tank 2. Therefore, the lubricating oil 25 can be delivered from the lubricating oil tank 2 to the pump chamber 37 through the lubricating oil delivery pipe 41, whereas the lubricating oil 25 is prevented from flowing reversely from the pump chamber 37 to the lubricating oil tank 2.

On the outer periphery of the rod body 30, there is coaxially disposed a coil 43 and, further, on the outer periphery of the coil 43, there is disposed a yoke 44 which is formed of magnetic material and forms a magnetic circuit in conjunction with the rod body 30. The yoke 44, the base end of the cylinder 36 on the rod body 30 side thereof, and part of the lubricating oil delivery pipe 41 are stored in the interior portion of the case 32.

To the coil 43, there is electrically connected the control device 6. The control device 6 outputs to the coil 43 a current which is used to generate a magnetic field. Due to application of this current to the coil 43, the rod body 30 receives the magnetic field generated from the coil 43 and is thereby expanded, so that the lubricating oil 25 within the pump chamber 37 is passed through the pipe 38 and is discharged out from the nozzle 20.

Figure 4:
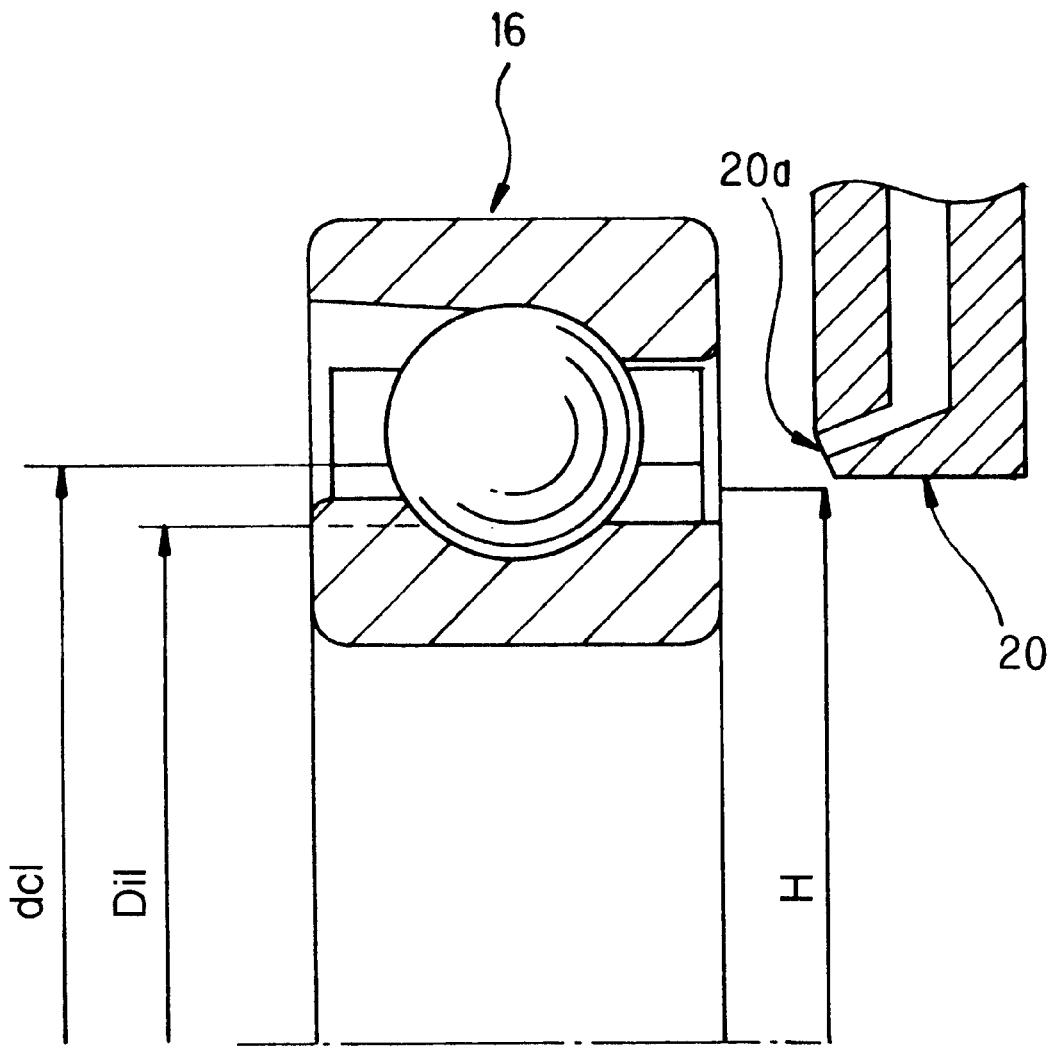
FIG. 4 is an enlarged view showing the angle and position of a nozzle.

Referring to the shape of the nozzle 20, as shown in FIG. 4, the discharge opening portion 20a of the nozzle 20 in the leading end of the flow passage is formed in an inclined manner, so that a pipe can be arranged even in a narrow space. In case where there is room in the pipe installation space, the nozzle can be formed in a straight manner and the pipe can be installed obliquely or horizontally at an oil supply target position. Referring to the lubrication in the interior portion of the bearing, since the oil supply quantity is very fine, the oil supply target position is important. As the oil supply target position, as shown in FIG. 4, the contact portion between the inner race and ball is preferred. Thanks to this, a retainer and outer raceway surface can be lubricated by the lubricating oil 25 which is allowed to flow outside due to a centrifugal force generated with respect to the inner raceway surface. For example, the diameter H of the oil supply target position can be set such that H=(dc1+Di1)/2. Here, dc1 expresses the inside diameter of the retainer, and Di1 expresses the outside diameter of the inner race. In this manner, by designing the angle and position of the nozzle 20 optimally, the lubricating oil can be accurately supplied at a desired position in the interior portion of the bearing in a pin-spot supply manner.

Next, description will be given below of the operation of the super fine quantity oil lubricating pump 5.

Figure 5:
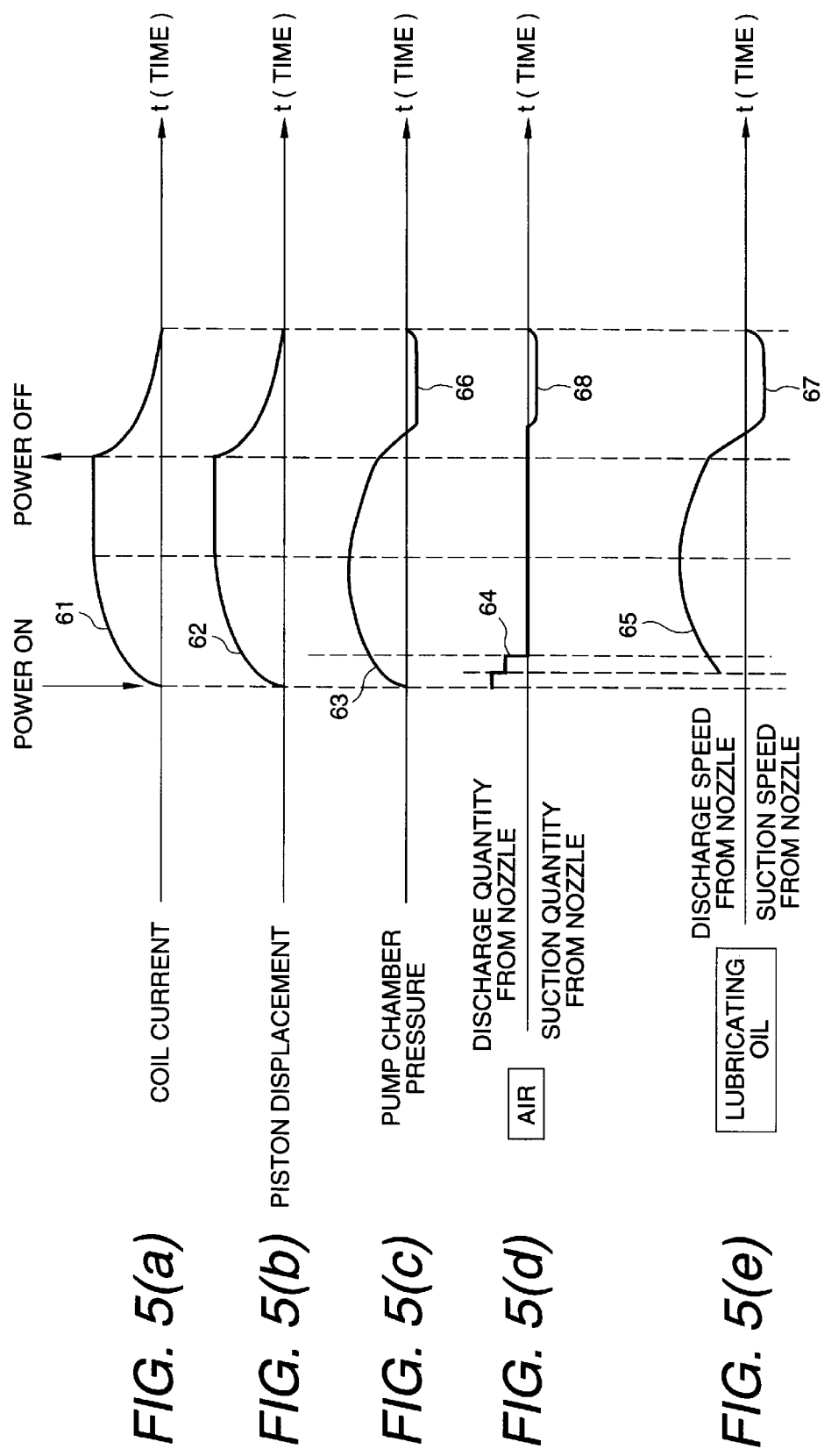
FIGS. 5(*a*), 5(*b*), 5(*c*), 5(*d*) and 5(*e*) are views of a time chart showing the time relationship between currents to be applied to a coil and the discharge of lubricating oil.
Figure 6:
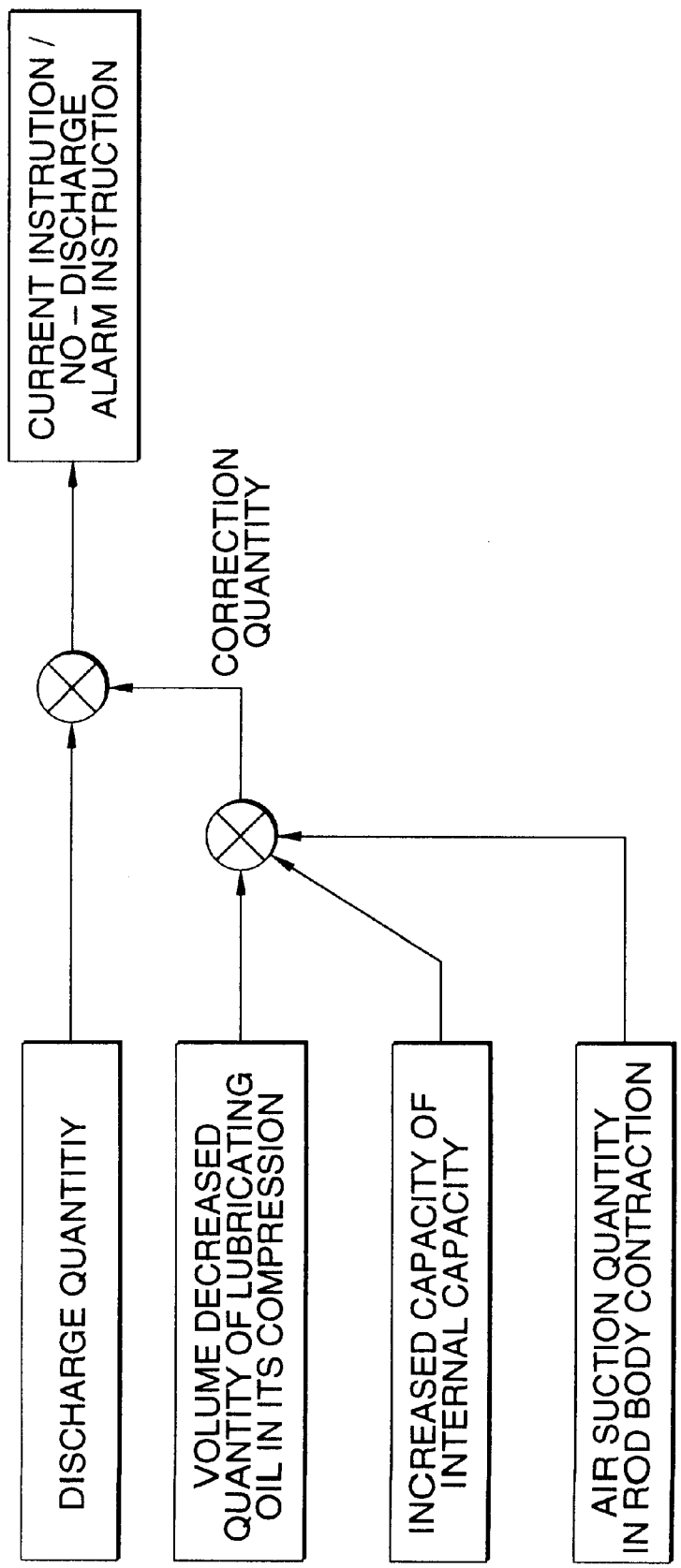
FIG. 6 is a block diagram showing a procedure for a discharge quantity correction to be operated by a control device in order to obtain a fixed discharge quantity.

FIG. 5 shows a time chart representing the time relationship between currents to be applied to the coil 43 and the discharge of the lubricating oil, and FIG. 6 shows a block diagram displaying the procedure for the discharge quantity correction to be operated by the control device 6 in order to obtain a fixed quantity of oil discharge.

In case where a current is output from the control device 6 to the coil 43 in accordance with a pattern (61) shown in (a) of FIG. 5, the coil 43 generates a magnetic field to thereby expand the rod body 30 formed of giant magnetostrictive material. Since one end portion 30a side of the rod body 30 is fixed, the rod body 30 is expanded in the axial direction thereof on the other end portion 30b side thereof; and, the piston 35 follows this expanding operation and thus moves in a pattern (62) similar to a current shown in (b) of FIG. 5.

As the piston 35 moves, the lubricating oil 25 within the pump chamber 37 is compressed and, as shown in a pressure increase pattern in (c) of FIG. 5, the pressure within the cylinder 36 is increased. Due to such increase in the pressure, the suction valve 40 in the suction port 39 is closed so that the air accumulated in the leading end portion of the nozzle 20 in the previous discharge is discharged from the nozzle 20 in such a manner as shown by a discharge pattern (64) in (d) of FIG. 5. After then, the lubricating oil 25 is discharged out to the outside from the nozzle 20 at high speed in such a discharge pattern (65) as shown in (e) of FIG. 5. And, in case where the current to the coil 43 becomes steady, the expansion of the rod body 30 is caused to stop and the pressure of the pump chamber 37 is lowered due to the discharge of the lubricating oil 25.

After then, in case where the output of the current from the control device 6 to the coil 43 is stopped, the expanded rod body 30 contracts so as to return back to its original condition, so that the internal capacity of the pump chamber 37 is increased. At the then time, as shown by a pressure pattern (66) in (c) of FIG. 5, the pump chamber 37 becomes negative in pressure, with the result that, as shown in a discharge pattern (67) in (e) of FIG. 5, the lubricating oil 25 is supplied through the suction valve 40 to the pump chamber 37. At the same time, as shown by a discharge pattern (68) in (d) of FIG. 5, a slight quantity of air also flows in from the leading end of the nozzle.

The flow-in quantity of this air is sufficiently small when compared with the supply quantity of the lubricating oil 25. Referring further to the flow-in quantity of the lubricating oil 25 and the flow-in quantity of the air, because the sectional area of the nozzle flow passage in a direction at right angles to the axial direction of the nozzle is sufficiently smaller than the sectional area of the suction valve flow passage in a direction at right angles to the axial direction of the suction valve 40, and also because the suction valve 40 is situated closer to the piston 35 than the nozzle 20, the negative pressure transmission time is shortened, with the result that the quantity of the lubricating oil from the suction valve 40 becomes larger than the flow-in quantity of the air. Therefore, in the next discharge operation time as well, similarly, the lubricating oil discharge is possible.

Preferably, the volume of the nozzle hole of the nozzle 20 may be equal to or greater than the volume of the air flowing from the nozzle hole in the above-mentioned suction step. The reason for this is as follows: that is, because the resistance of the air when the air passes through the nozzle hole is smaller than the resistance of the lubricating oil 25 when it passes through nozzle hole, in case where the nozzle hole is completely filled with the air, the fluid resistance of the nozzle hole is smaller than that of the suction side check valve, which raises a fear that the lubricating oil 25 is difficult to be sucked in from the suction side check valve.

There may also be interposed a check valve between the pump chamber 37 and the discharge side pipe. By the way, in this case as well, due to delay in the response of the discharge side check valve as well as due to the closing operation of the valve, a slight quantity of air flows in through the nozzle hole; that is, it can be expected to avoid a fear that the lubricating oil 25 can drip down from the leading end of the nozzle, but the oil dripping preventive effect is lowered.

Now, since there are present the flow-in of the air from the nozzle 20 when the rod body 30 is contracted, a decrease in the volume of the lubricating oil 25 caused by the compression of the lubricating oil 25 within the internal capacity between the suction valve 40 and the exit of the nozzle, and an increase in the internal capacity caused by the pressure deformation of parts defining the internal capacity such as a cylinder and a pipe, although they are respectively very small in quantity. In order to be able to discharge the lubricating oil 25 in a desired quantity from the nozzle 20 with accuracy, it is necessary to set the discharge quantity with these variable elements taken into account.

In view of this, the super fine quantity oil lubricating pump 5 according to the present embodiment is characterized in that a current is applied to the coil 43 from the control device 6 with these variable elements taken into account. That is, in the present embodiment, as shown in FIG. 6, "the volume decrease quantity of the lubricating oil when compressed", "increase in the internal capacity", and "air suction quantity when the rod body is contracted" are regarded as main variable elements; and, the current is set with these variable elements taken into account. The variable elements may further include other elements such as the temperature of the lubricating oil 25 and the viscous resistance of the lubricating oil 25.

A decrease in the capacity of the pump chamber 37 caused when the rod body 30 is expanded, as shown in an equation (1), is equal to the sum of the quantity of the air flowing in from the nozzle 20 when the rod body 30 is compressed, the volume decrease quantity of the lubricating oil 25 within the internal capacity between the suction valve 40 and nozzle exit when the lubricating oil 25 is compressed, an increase in the internal capacity due to the pressure deformation of the parts defining the internal capacity, and a required discharge quantity of the lubricating oil 25 to be discharged from the nozzle 20.

Decrease in the capacity of the pump chamber 37 (piston cross sectional area×piston movement length)=

(quantity of the air flowing in from the nozzle when the rod body is contracted)+

(volume decrease quantity of the lubricating oil due to high pressure)+

(increase in the internal capacity due to high pressure)+(required discharge quantity $Qrf$) (1)

By controlling the current to be applied to the coil 43 in such a manner as to satisfy the equation (1), a very small quantity, that is, of the order of 0.0005–0.01 cc of the lubricating oil 25 can be discharged out intermittently at the high speeds of approx. 10 m/sec.–100 m/sec.

By the way, as the values of the respective items in the equation (1), the measured or set values can be used depending on a spindle apparatus used.

The discharge quantity of the lubricating oil 25 can be found according to an equation (2).

$$Qr=\Delta f \qquad (2)$$

Here, Qr[cc/sec.] expresses a required discharge quantity (a set discharge quantity), $\Delta$[cc/shot] expresses a discharge quantity per operation when a rated current is supplied, and f[shot/sec.] expresses an operation frequency (a supply frequency) to be applied to the coil 43.

Figure 7:
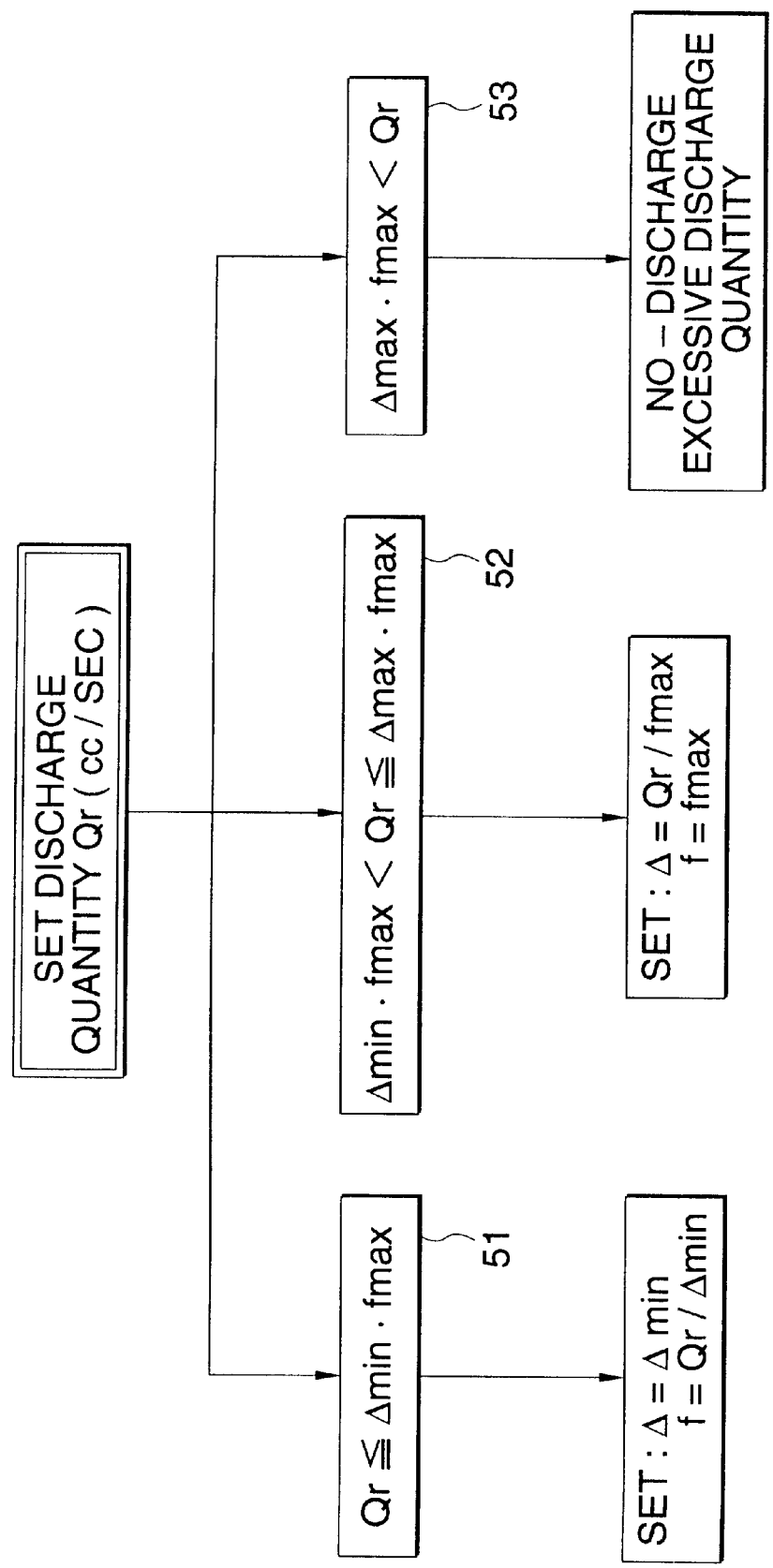
FIG. 7 is a block diagram of an example of a current control function by discharge quantity.

The set discharge quantity Qr calculated is classified to three conditions shown in FIG. 7 according to the value thereof and are then controlled respectively.

At first, in case where the set discharge quantity Qr is equal to or smaller than a discharge quantity when the minimum shot is carried out at the highest operation frequency, that is, in the case of (51) where Qr≦Δmin·fmax, a discharge quantity Δ per operation and an operation frequency f are respectively set in the following manner:

That is, $\Delta=\Delta\mathrm{min}, f=Qr/\Delta\mathrm{min}$.

Here, Δ min[cc/shot] expresses the minimum discharge quantity per operation at the minimum current that can be controlled, in the present embodiment, it is set as 0.001 [cc/shot]. Also, fmax [shot/sec.] expresses the highest operation frequency that can be output in the present apparatus.

Therefore, a final set discharge quantity (a required discharge quantity) Qrf in this case is set according to an equation (3)

$$Qrf=\Delta\mathrm{min}\times(Qr/\Delta\mathrm{min}) \qquad (3)$$

Also, in the case of (52) where a set discharge quantity Qr is Δmin·fmax<Qr≦Δmax·fmax (here, Δ max[cc/shot] is the maximum discharge quantity per operation at the controllable maximum current), a discharge quantity Δ per operation and an operation frequency f in a position operation are respectively set in the following manner:

That is, $\Delta=Qr/f\mathrm{max}, f=f\mathrm{max}$.

Therefore, a final set discharge quantity (a required discharge quantity) Qrf in this case is set according to an equation (4).

$$\text{That is, } Qrf=(Qr/f\mathrm{max})\times f\mathrm{max} \qquad (4)$$

And, in the case of (53) where a set discharge quantity Qr is set such that Δmax·fmax<Qr, since this quantity is exceeds the discharge ability of the present apparatus, a discharge disapproval signal is output from the control device 6 (see FIG. 6).

As a result, according to the above-mentioned super fine quantity oil lubricating pump 5, there can be provided the following effects.

That is, in the contracted condition of the rod body 30, since the air flows in from the nozzle 20 and the leading end of the liquid surface of the lubricating oil is thereby moved to the interior portion of the nozzle, the lubricating oil can be prevented from dripping down when the present pump is out of operation.

Also, in the expanded condition of the rod body 30, during the time when the air in the leading end of the nozzle is pushed out, the pressure of the lubricating oil 25 within the cylinder 36 is increased. For this reason, there is produced a slight delay in the time necessary for the lubricating oil 25 to be discharged from the nozzle end. However, this delay time is cancelled by the time necessary for the lubricating oil 25 to be increased up to a given pressure. As a result of this, at the discharge time of the lubricating oil 25, there can be obtained a high discharge speed which is close to a given speed, which makes it possible to reduce a possibility that the lubricating oil 25 can be discharged at a speed less than the given speed.

Further, since the cross sectional area S of the cylinder 36 in a direction at right angles to the axial direction thereof is set smaller than the cross sectional area A of the rod body 30, the pressure of the lubricating oil 25 within the cylinder can be made higher than the pressure generated in the rod body 30 itself, which makes it possible to discharge the lubricating oil 25 at a higher pressure.

And, by bringing the lubricating oil 25 into direct contact with the surface to be lubricated, there is eliminated the need for provision of an air pump which is used to deliver the lubricating oil 25.

Also, when increasing the pressure of the lubricating oil 25 within the cylinder up to a high pressure, the compression of the lubricating oil 25 and the expansion of the cylinder 36 cannot be neglected; however, because the current to be applied to the coil 43 is corrected by these variable elements, a desired discharge quantity can be obtained with high accuracy.

Further, since the coil current is controlled to thereby be able to adjust the lubricating surface contact quantity of the lubricating oil 25 easily, there is no need for provision of a fixed quantity valve. This makes it possible to realize a lubricating device which is simple in structure and compact in size.

Also, the control device 6 may also be a device which detects the rotation speed of a rotary body to be lubricated, and supplies to the coil 43 a current having a current value corresponding to the detect signal and/or a current supply frequency corresponding to the detect signal, thereby adjusting a lubricating oil discharge quantity. In this case, the lubricating oil 25 can be supplied in the optimum quantity that can vary according to the rotation speed of the rotary body. This not only can prevent the excessive supply of the lubricating oil 25 but also can always provide the optimum lubricating effect.

For example, the rotation speed of a shaft (a rotary body) of a bearing, to which the lubricating oil is to be supplied, is detected by an encoder, and the thus obtained rotation speed is input to the control device 6. The control device 6 outputs a coil current while adjusting the current value and operation frequency of a drive current to be applied to the coil 43 in such a manner that, when the rotation speed is high, the lubricating oil 25 can be supplied in a large quantity and, for the slow rotation speed, the lubricating oil 25 can be supplied in a small quantity.

Figure 8:
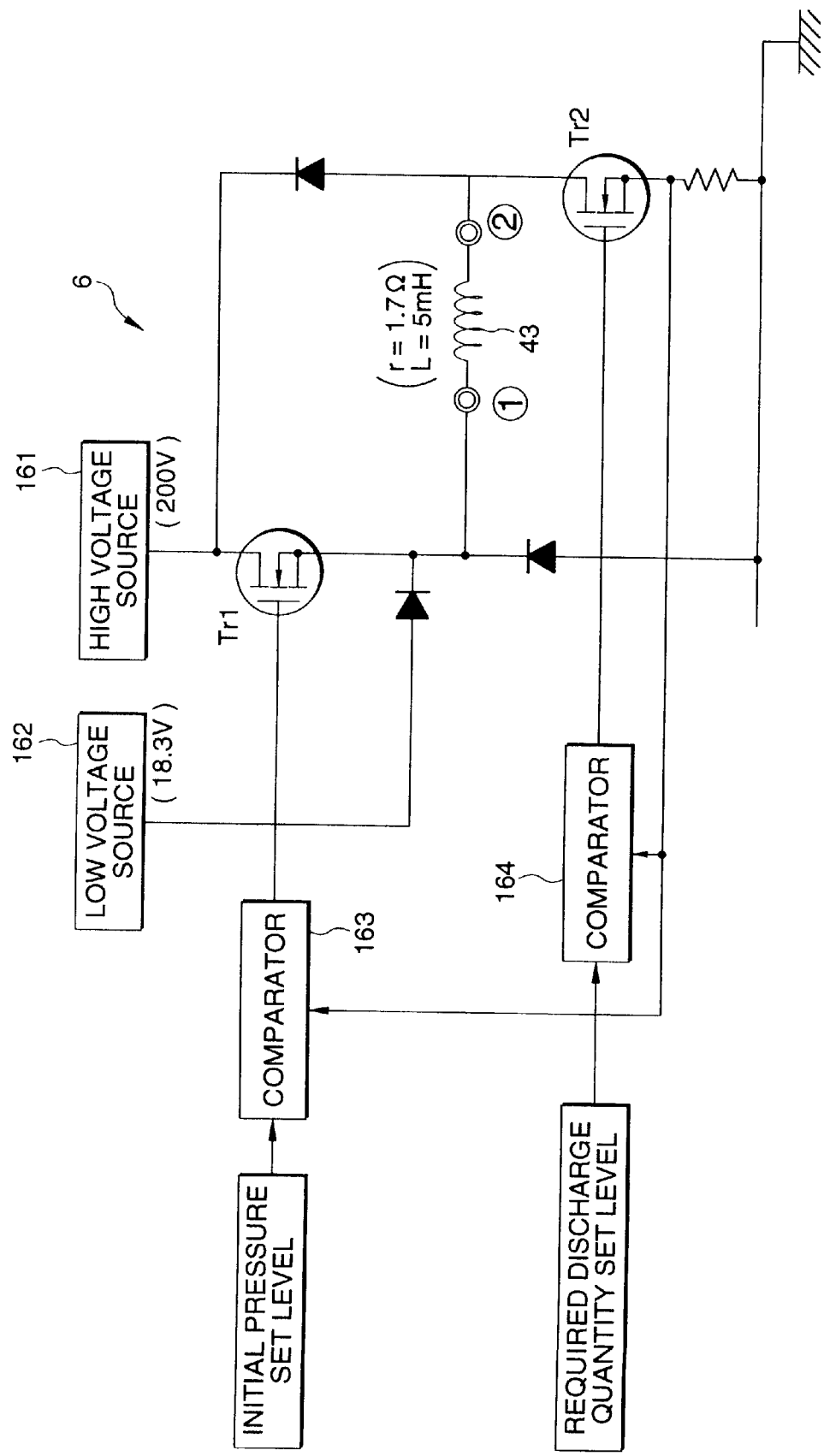
FIG. 8 is a circuit diagram of a coil control device employed in a lubricating device.

Now, FIG. 8 shows the circuit configuration of the coil control device employed in the lubricating device according to the present embodiment. The control device 6 according to the present embodiment is connected to the coil 43 which is used to expand the rod body 30 made of the giant magnetostrictive element shown in FIG. 3, and controls the application of a current to the coil 43.

As shown in FIG. 8, the control device 6 comprises a high voltage source 161 for causing an applying current to rise suddenly, a low voltage source 162 for obtaining a required lubricant discharge quantity after the rise of the applied current, and two transistors (FET) Tr1 and Tr2 which are respectively used to switch these voltage sources 161 and 162 according to the outputs of two comparators 163 and 164.

Referring now to the operation of the control device 6, in case where Tr1 and Tr2 are both firstly turned on, a current is supplied to the coil by the high voltage source 161 and low voltage source 162. At the then time, as shown by a current waveform in FIG. 9, the coil current rises suddenly up to an initial pressure set level (a first current value). The rising characteristic of the coil current is shown by an equation (5).

$$I(t)=E/r[1-\exp\{-rt/L\}] \tag{5}$$

where, I: current, E: voltage, r: resistance, and L: inductance.

For example, assuming that the coil resistance r is 1.7 [Ω], the inductance L is 5 [mH] and the voltage is 200 [V], the current I(t) reaches 5 [A] with the passage time t of 128 [μs] according to the above equation.

Figure 9:
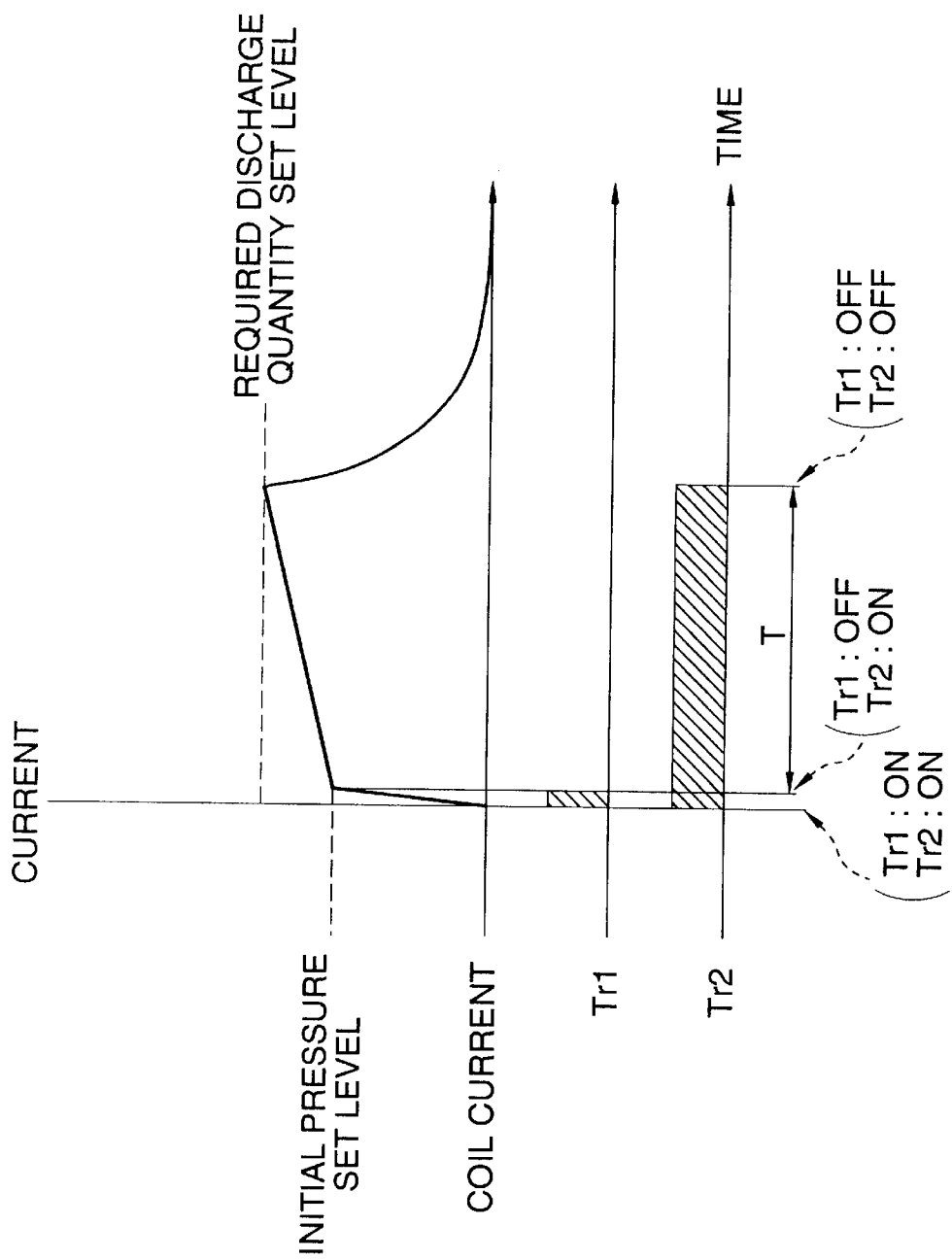
FIG. 9 is an explanatory view showing coil current waveforms in conjunction with the operation of a transistor.

As shown in FIG. 9, in case where 5 [A] is set as the initial pressure set level, the control device 6 detects that the current reaches 5 [A] and thus the control device 6 turns off Tr1. In response to this, the current is supplied to the coil only from the low voltage source side thereof. The then voltage E of the low voltage source can be found in the following manner.

If the sectional area of the nozzle is expressed as Sn [mm²], the cross sectional area of the cylinder internal capacity is expressed as Sc [mm²] and the expansion of the giant magnetostrictive element is expressed as ΔL [mm/A], then the expansion speed vm [mm/s] of the giant magnetostrictive element necessary to obtain a required discharge speed v [mm/s] can be expressed by an equation (6).

$$vm=v \cdot Sn/Sc \tag{6}$$

Also, the required increase speed I' [A/s] of the current can be expressed by an equation (7).

$$I'=vm/\Delta L \tag{7}$$

For example, assuming that the sectional area Sn of the nozzle is 0.008 [mm²], a required discharge speed v is 50000 [mm/s], and the cross sectional area Sc of the cylinder internal capacity is 30 [mm²], the required expansion speed vm of the giant magnetostrictive element is 13.3 [mm/s].

At the then time, assuming that the expansion ΔL of the giant magnetostrictive element is 0.01 [mm/A], the required increase speed ΔI of the current is 1330 [A/s].

Also, assuming that the discharge quantity is 1 [mm³], the required current increase ΔI can be obtained in the following manner: that is, $$\Delta I=1/(Sc \cdot \Delta L)=3.3[A].$$

A required time T necessary to reach this current value can also be obtained in the following manner: that is, $$T=3.3/1330=2.48 \times 10^{-3}[s].$$

If the above respective parameters are substituted into the equation (5), then the voltage E is 18.3 [V]. Therefore, under the above condition, this voltage E may be set as the voltage value of the low voltage source 162.

In this manner, by setting the voltage of the low voltage source as a voltage value to be determined according to the discharge speed, there can be obtained a desired discharge speed in a given pump. And, when the time T passes after the current value reaches an initial stress set level, that is, when a desired discharge quantity is obtained, Tr2 is also turned off to thereby cut the coil current. In case where the generation of the coil current due to the on and off operations of Tr1 and Tr2 is achieved at a given operation frequency, the lubricant can be discharged intermittently from the lubricating device.

According to the present system, when compared with a dropper system in which a current is controlled by feeding back the current, and a pulse width control system, the circuit of the control device can be configured in such a manner that power can be saved and the cost thereof can be reduced.

By the way, the circuit according to the present embodiment is a circuit in which the voltage value can be switched and turned off automatically according to the current value of the coil. However, the voltage value may also be switched and turned off by a timer.

Also, in FIG. 9, the current is turned off after the current value reaches a required discharge quantity level. In this case, preferably, the current value may be lowered little by little in order to prevent cavitation from occurring within the pump chamber.

Figure 10:
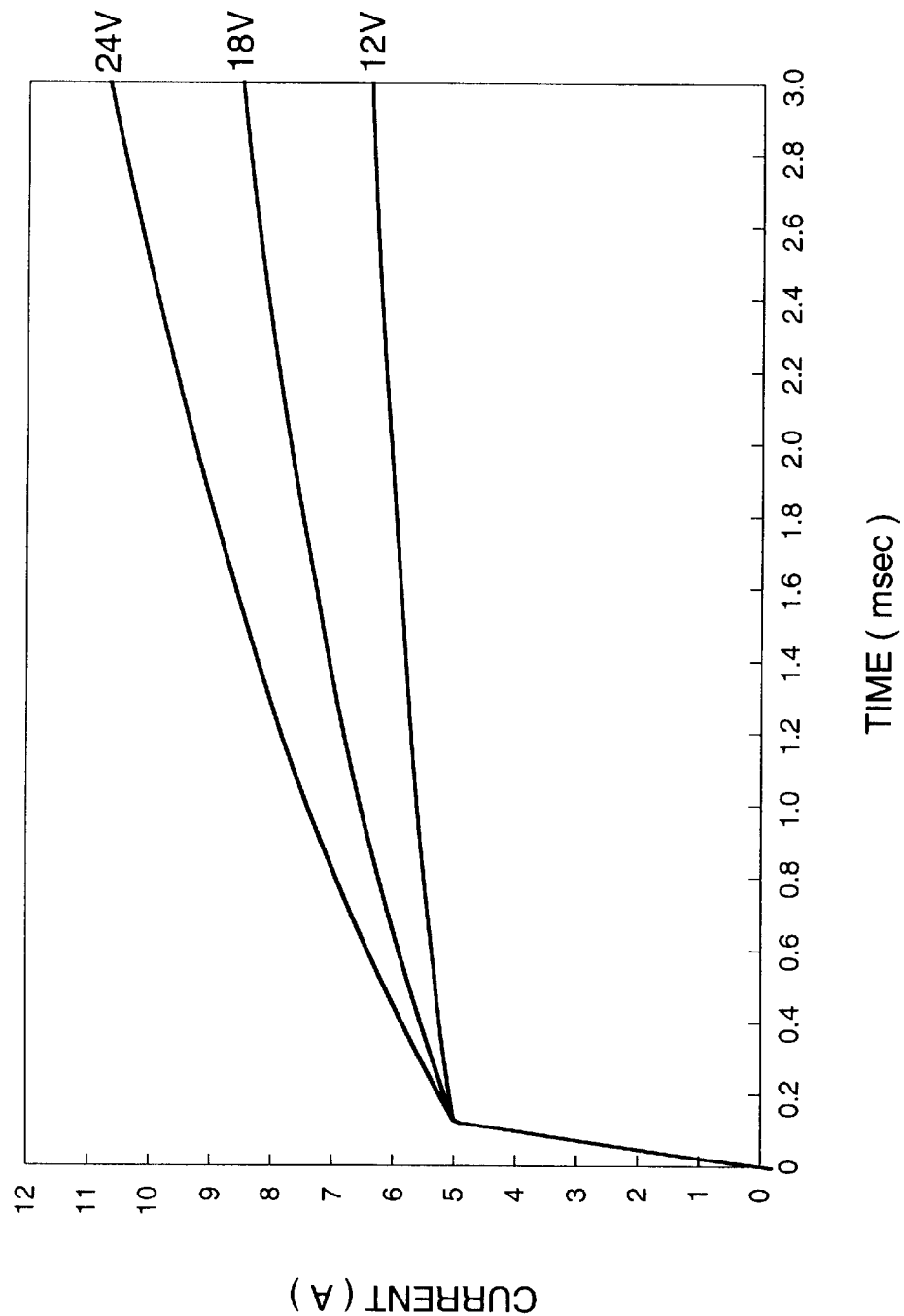
FIG. 10 is a graphical representation of an example of variations in the coil current with respect to the lapse of time.

Now, FIG. 10 is a graphical representation of an example of variations in the coil current with respect to the elapsed time. By the way, in this case as well, the inductance L of the coil is 5 [mH] and the resistance r is 1.7 [Ω].

As shown in FIG. 9, by turning on both of Tr1 and Tr2 of the control device 6 to thereby apply a high voltage, the coil current is caused to rise suddenly.

Next, Tr1 is turned off to thereby discharge the lubricant at a given discharge speed only by the low voltage source. In FIG. 10, the voltage values of the low voltage source is shown in three kinds, that is, 24 [V], 18 [V], and 12 [V]; and, the voltage E in the above-mentioned calculation example, which is 18.3 [V], is almost equal to the present calculation example which is 18 [V].

Also, the lubricating device according to the present embodiment is structured in such a manner that it can detect a trouble such as lubricant leakage or a clogged condition to thereby monitor the operating condition of the pump.

At first, description will be given below of the properties of the magnetostrictive element. As the typical properties of the magnetostrictive element, there can be given the following two properties.

One of them is a property which is referred to as a Joule effect due to which the magnetostrictive element can be distorted by a magnetic field acting on the magnetostrictive element. As described above, the magnetostrictive pump is structured such that it applies a magnetic field to a magnetostrictive element using this property to thereby expand the magnetostrictive element so as to be able to drive a piston.

The other is a property which is referred to as a Villari effect. The Villari effect is an effect in which the permeability of a magnetostrictive element is changed according to stresses applied to the magnetostrictive element. When a coil for driving is disposed in a magnetostrictive element, the inductance of the coil can be varied due to the Villari effect. Generally, in giant magnetostrictive material, in case where the stress increases up to about 1 [MPa], the inductance decreases about 30% with respect to the inductance when the stress is zero.

Trouble detection is possible by using this Villari effect in the following manner. That is, assuming that when a lubricating device is in normal operation, the pressure within a cylinder is, for example, about 4 [MPa] and the cross sectional area of a piston is ¼ of the cross sectional area of a giant magnetostrictive element, the stress of the giant magnetostrictive element is about 1 [MPa]. In this case, the decrease rate of the inductance of the coil including the giant magnetostrictive element is equal to a decrease rate corresponding to the present stress, that is, about 30%.

Here, in case where a trouble occurs in the lubricating device and the nozzle is thereby clogged, the pressure within the cylinder increases up to a high pressure in the range of 30–40 [MPa], and the stress of the giant magnetostrictive element also increases correspondingly to this cylinder pressure, with the result that the decrease rate of the inductance of the coil is about 40%. On the other hand, in case where lubricant leakage occurs within the giant magnetostrictive material pump, the pressure within the cylinder and the stress of the giant magnetostrictive element are both almost zero, and the decrease rate of the inductance of the coil is also almost zero.

In this manner, in case where any trouble occurs in the operating condition of the giant magnetostrictive material pump of the lubricating device, the decrease rate of the inductance of the coil varies greatly from 0% to 40%.

By the way, the rising characteristic of a current flowing in a coil, as described above, can be expressed by the equation (5).

Figure 11:
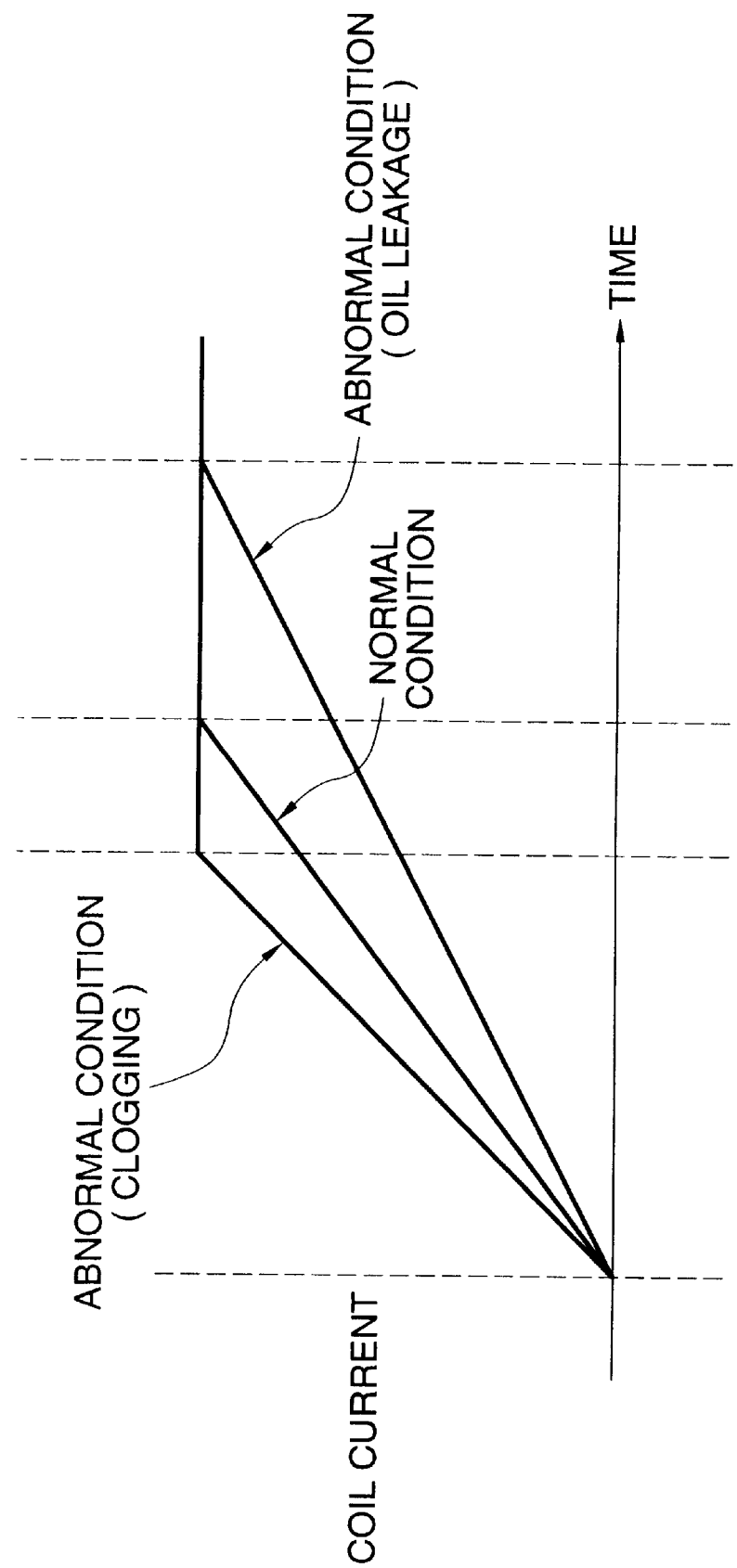
FIG. 11 is an explanatory view of the rising characteristic of the coil current in abnormal and normal conditions.

According to the equation (5), as shown in FIG. 11, when the decrease in the inductance of the coil is small, a current I flowing in the coil rises later than a design value; and, on the other hand, when the decrease in the inductance of the coil is large, the current I rises earlier than the design value.

In this manner, by detecting the rising time of the current flowing in the coil, the decrease rate of the inductance of the coil, that is, the stress of the giant magnetostrictive element can be detected.

Figure 12:
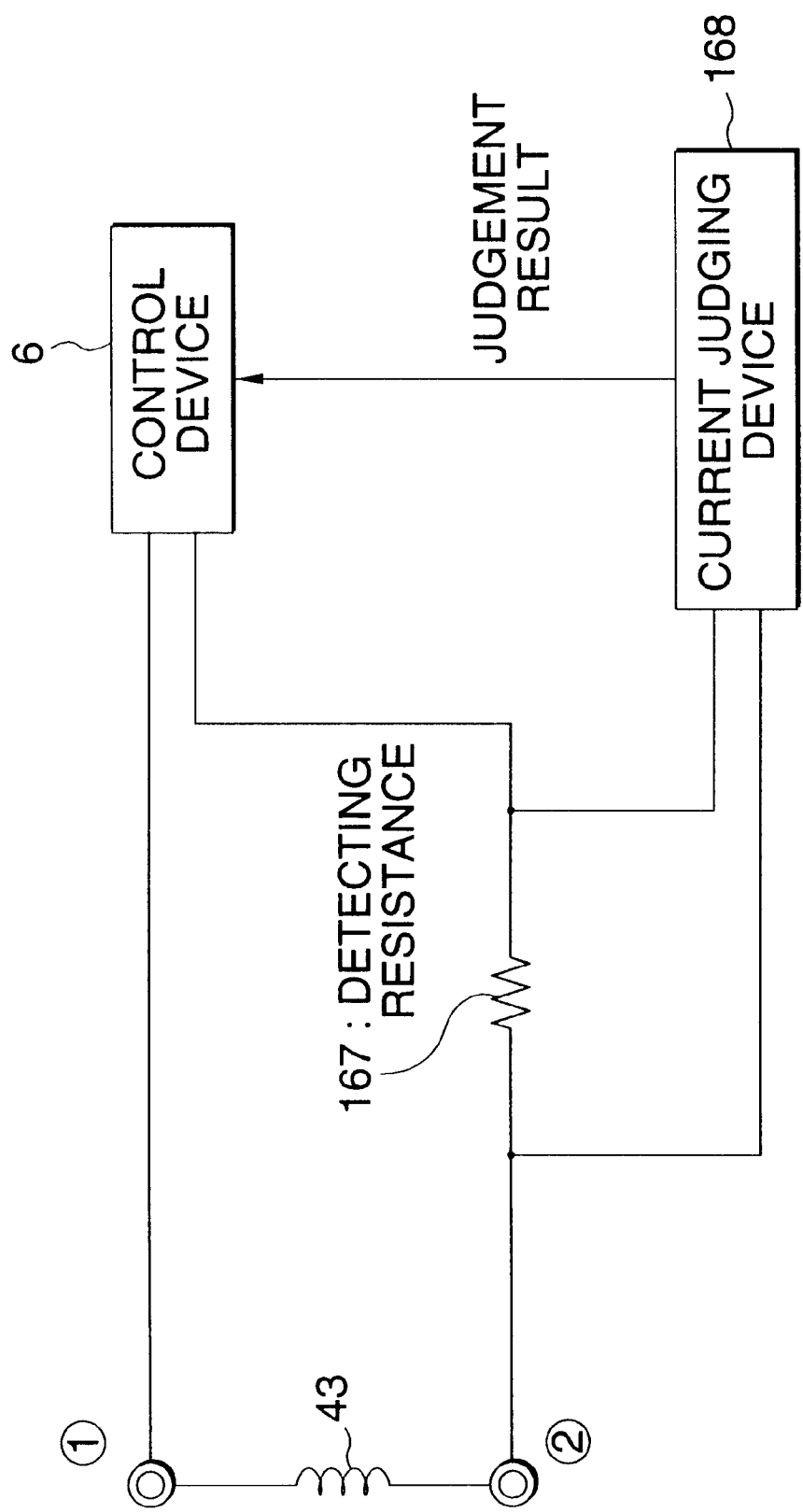
FIG. 12 is a view of a structure for detecting the coil current.

Thanks to the rising characteristic of the current, as shown in FIG. 12, by monitoring a current flowing in the coil 43 using a detecting resistance 167 and a current judging device 168, it is possible to judge whether the operating condition of the giant magnetostrictive material pump is good or not. The detecting resistance 167 and current judging device 168 respectively correspond to a current measuring device and a trouble judging device.

That is, in case where the rising time of the current flowing in the coil 43 is almost equal to the design value, it can be found that the giant magnetostrictive material pump is operating properly. In case where the rising time of the current is earlier than the design value, it can be found that the pressure within the cylinder 36 is caused to increase, for example, due to the clogged condition of the nozzle 20 and a great stress has been generated in the giant magnetostrictive element. Also, in case where the rising time of the current is later than the design value, it can be found that there has occurred a trouble such as the leakage of the lubricant form the lubricant flow passage and only a small stress has been generated in the giant magnetostrictive element.

Figure 13:
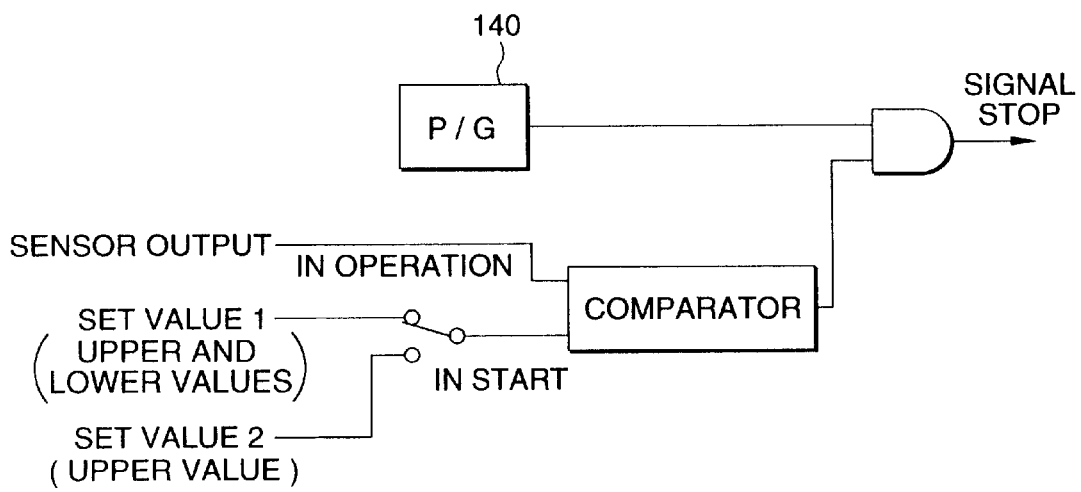
FIG. 13 is a block diagram of a schematic structure of a judging device.
Figure 14:
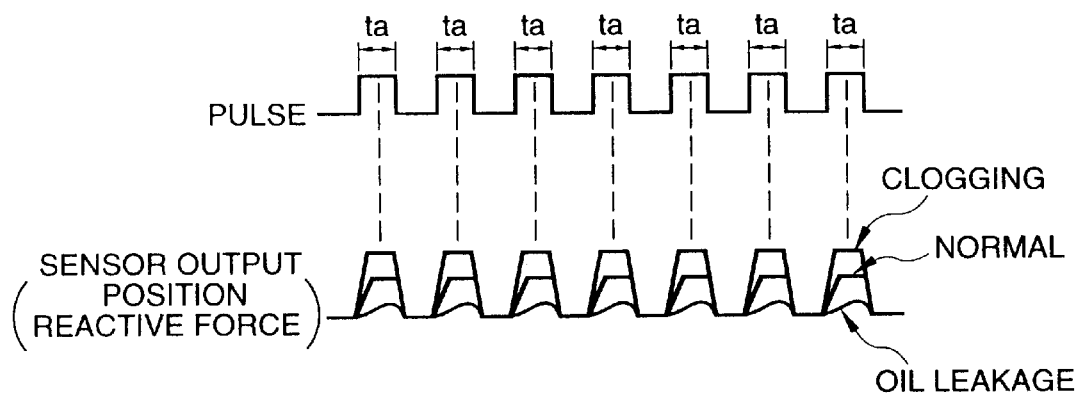
FIG. 14 is a time chart of the operation of the judging device.

Now, FIG. 13 is a block diagram of the schematic structure of the judging device 168, and FIG. 14 is a time chart showing pulse signals respectively generated in correspondence to discharge intervals as well as sensor outputs in steady and abnormal operations of the lubricating device. In this case, signals in the time when the lubricating device is in the discharging condition and detect signals are different in the normal and abnormal conditions, that is, signals in the time corresponding to the pulse issuing time ta shown in FIG. 14 are detected.

When detecting the abnormal condition occurrence during the steady operation of the lubricating device, at first, whether the present operating condition is in an air bleed condition in the start stage or not is judged by comparing the cycle number and stroke of the piston 35 with their respective set values. When it is found that the present operating condition is not in the start stage, the output of the coil current is compared with a set value 1 which is a set value for the normal operation. In case where the output of the coil current falls within the range of the lower to upper limits of the set value 1, the current operation continues on as it is; and, on the other hand, in case where it is out of the range of the set value 1, the judging device 168 issues a stop signal for stopping the operation of the lubricating device. Due to this, the detection of the abnormal condition occurrence in the steady operation and the stop of the lubricating device are possible.

A pulse generator 140 shown in FIG. 13 links a signal for controlling the intermittent operation of the lubricating device with the judging device 168, or links such signal with a timer built in the judging device 168 or a separately provided timer to thereby be able to monitor an output signal from a sensor corresponding to the pulse issuing time ta shown in FIG. 14. Also, as the judging device 168, there can be used not only the lubricating device but also a computer which controls the operation of a machine in which the lubricating device is used.

As described above, since there is a close relationship between the pressure of the interior portion of the cylinder 36 and the discharge of the lubricant from the nozzle 20, when the rising of the current of the coil 43 is shifted from the designed target value, it is supposed that the discharge of the lubricant from the nozzle 20 is also out of order.

Here, referring to an example where the lubricating device according to the invention is used as a device for supplying the lubricant to the rolling bearing of a high-speed spindle, when it is detected that the rising characteristic of the coil current is shifted from the target value, the current judging device 168 is allowed to issue an abnormal signal to thereby be able to enforce a feedback control, for example, to stop the rotation of the high-speed spindle urgently.

Also, the present embodiment is structured such that completion of air bleed from the nozzle can be detected.

As described before, thanks to the Villari effect that is one of the main properties of a magnetostrictive element, with respect to the inductance when a stress given to a giant magnetostrictive element is zero, the inductance when the stress is 1 [MPa] decreases about 30%.

Figure 15:
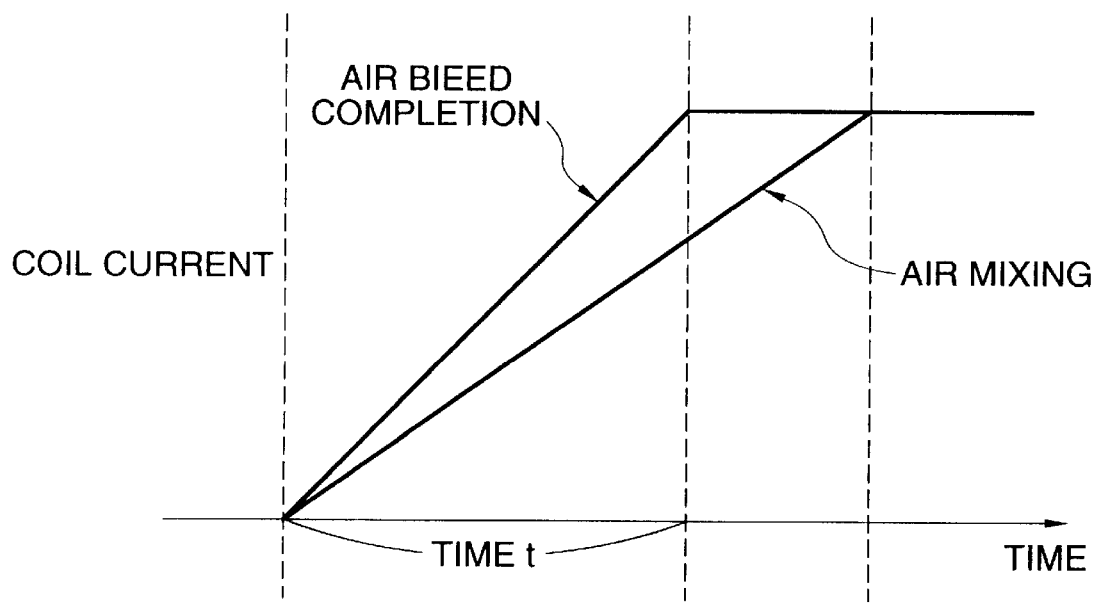
FIG. 15 is an explanatory view of the rising characteristic of the coil current in an air mixing condition and after an air bleed completed condition.
Figure 16:
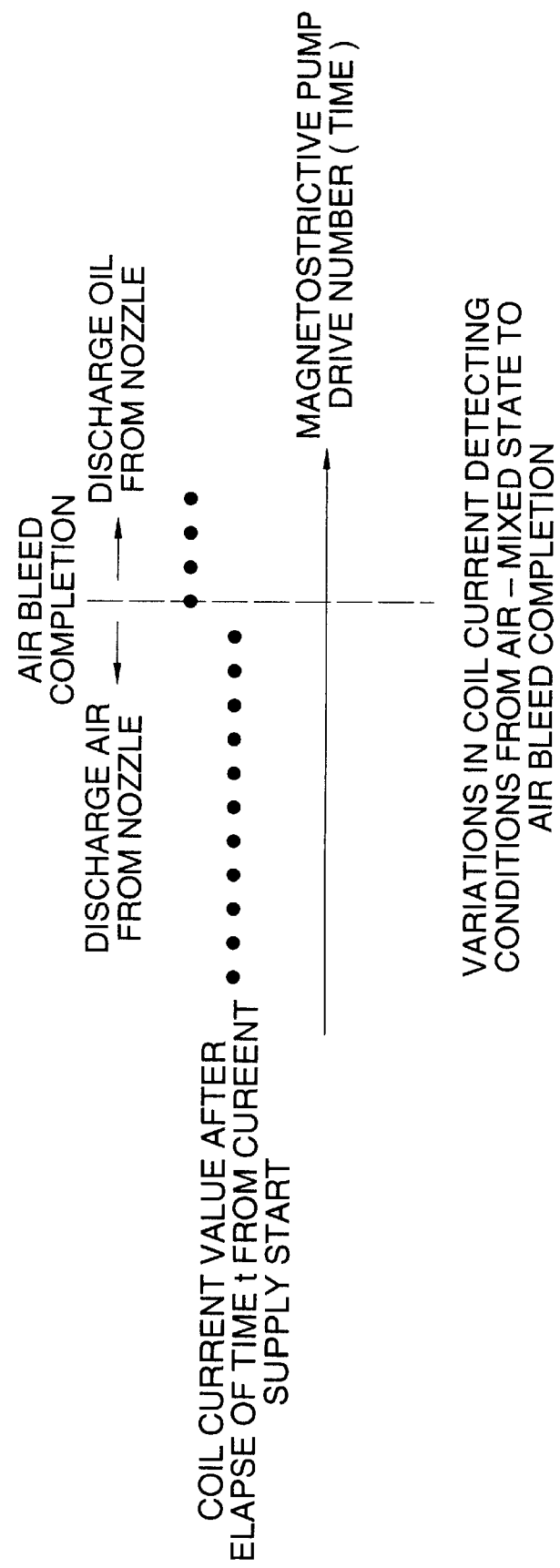
FIG. 16 is a view of a coil current detect condition from the air mixing condition to the air bleed completed condition.

Due to the above relationship, the quickness of the rising of a current flowing in a coil shown in FIG. 15 is connected with a stress which a giant magnetostrictive element receives, that is, is connected with the pressure in the interior portion of a cylinder. Therefore, by detecting a current flowing in a coil as shown in FIG. 16 using the detecting resistance 167 and current judging device 168 (which respectively correspond to a current measuring device and an air mixture judging device) shown in FIG. 12, completion of air bleed of a giant magnetostrictive material pump can be judged.

In other words, when detecting the air bleed completion in the start time of the operation of the lubricating device, when the rising characteristic of the current is compared with the characteristic of the current in the normal state thereof, in case where the current rising time is longer than a given steady time, that is, when the current value after the time t is small, it is judged that the air remains within the cylinder 36 and within the lubricant flow passage. When the air remains still, in order to remove the air in a short time, the giant magnetostrictive material pump is operated by the control device 6 shown in FIG. 3 in such a manner that the piston 36 can be driven at a faster cycle than the steady state thereof as well as with a large stroke. After then, when the air bleed is completed, that is, when the current value becomes the steady value, the giant magnetostrictive material pump is returned back to its steady state operation.

Due to this, for example, when the lubricating device is operated for the first time or when the operation of the lubricating device is started in the morning, the air bleed can be automatically completed in a short time.

Figure 17:
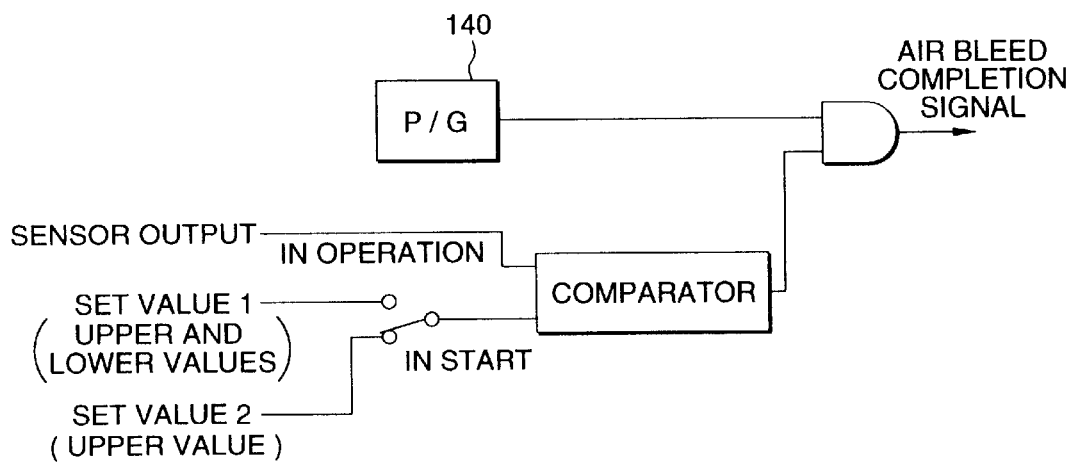
FIG. 17 is a block diagram of a schematic structure of an air bleed completion judging device.
Figure 18:
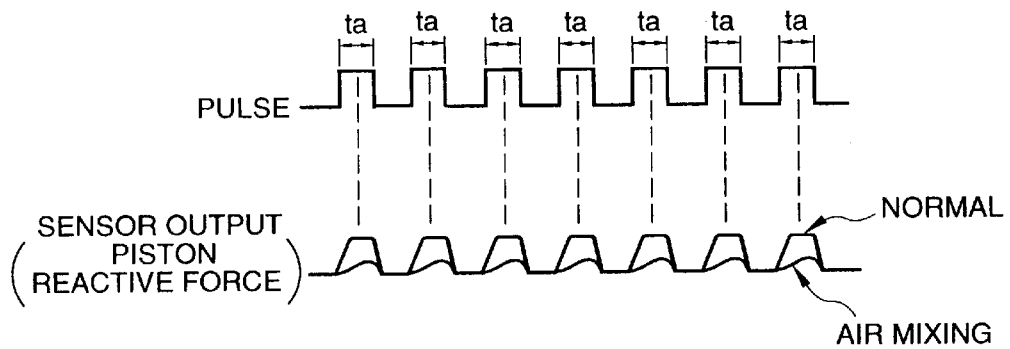
FIG. 18 is a time chart of the operation of the air bleed completion judging device.

Now, FIG. 17 is a block diagram of the schematic structure of the judging device 168 which is used to judge the air bleed completion, and FIG. 18 is a time chart pulse signals to be generated correspondingly to discharge intervals as well as sensor outputs in the air mixing time and in the air bleed completion time when the lubricating device is started. In this case, the judging device 168 detects a signal which corresponds to the time when not only the lubricating device is in the discharge state but also there is a difference in a detect signal between the normal state and the air mixed state, that is, a signal which corresponds to the pulse issuing time ta shown FIG. 18. Similarly to the above, in case of detecting the completion of air bleed, whether the present operating state is the air bleed state in the start time of the lubricating device or not is judged by comparing the number of cycles and strokes of the piston 35 with their respective set values. When the operating state is the start time, the output of the pressure sensor is compared with the set value 2 that is a set value in the normal state. In case where the output of the pressure sensor is smaller than the set value 2 and out of the set range, the current operation is allowed to continue on. On the other hand, in case where it is equal to or larger than the set value 2, there is generated a signal which shows that the operation is in the steady state.

In this manner, whether the air bleed is completed or not can be detected as well as the cycle number and stroke of the piston 5 can be switched to the steady operating state.

A pulse generator 140 shown in FIG. 17 links a signal for controlling the intermittent operation of the lubricating device with the judging device 168, or links such signal with a timer built in the judging device 168 or a separately provided timer to thereby be able to monitor an output signal from a sensor corresponding to the pulse issuing time ta shown in FIG. 18. Also, as the judging device 168, there can be used not only the present lubricating device but also a computer which controls the operation of a machine in which the lubricating device is used.

Next, description will be given below of a performance test conducted on the super fine quantity oil lubricating pump 5.

Figure 19:
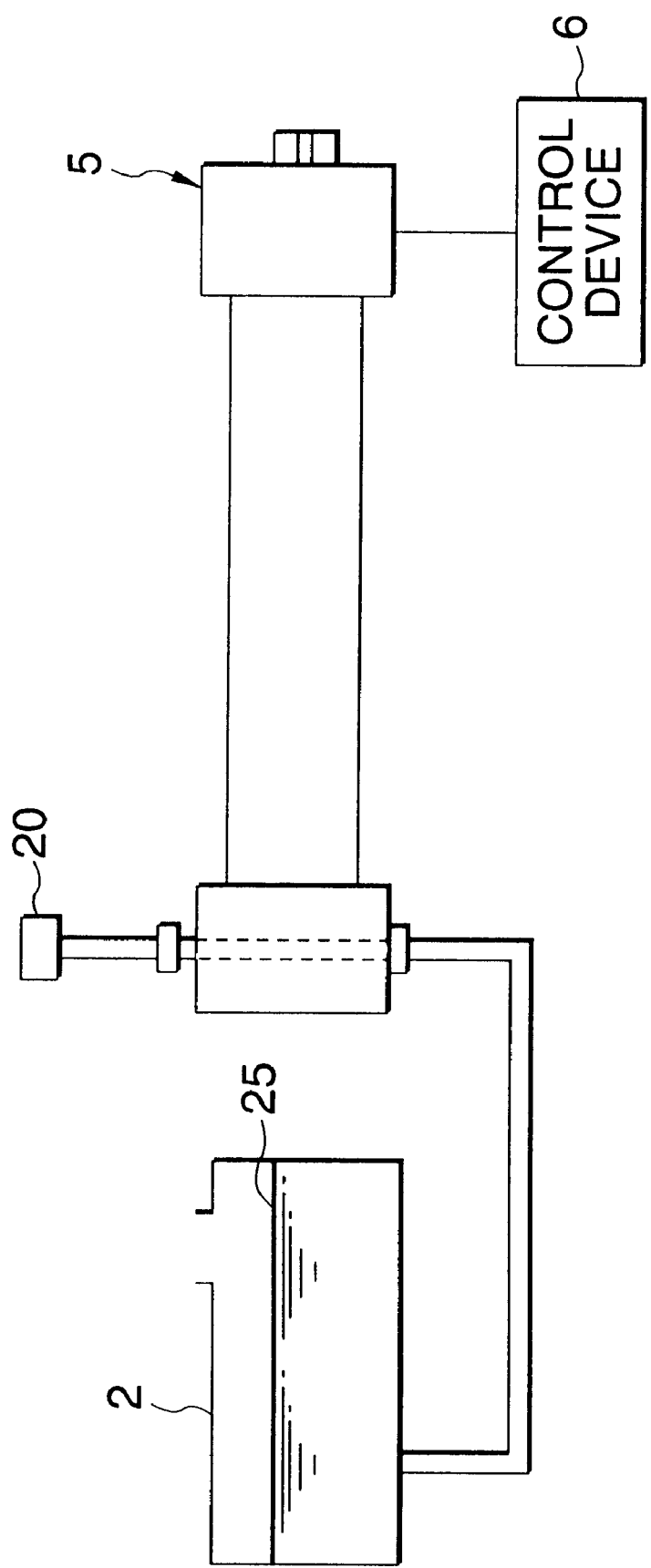
FIG. 19 is a schematic view of an embodiment in testing the performance of a super fine quantity oil lubricating pump.
Figure 20:
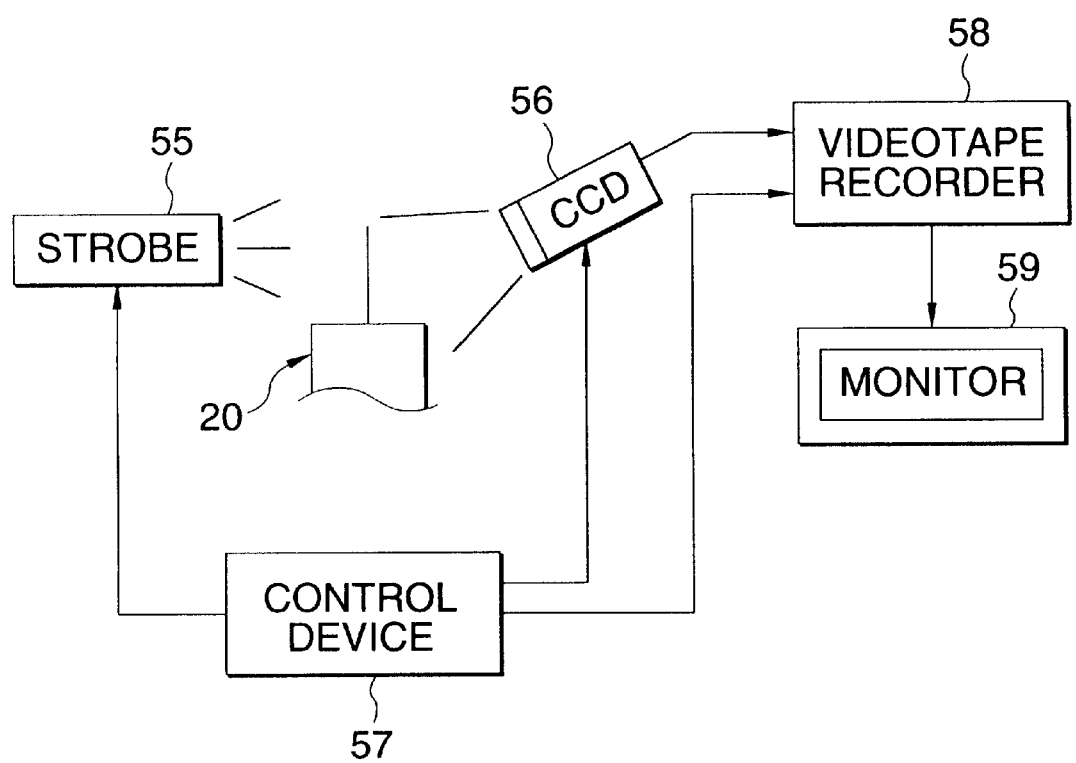
FIG. 20 is a schematic view of an embodiment of a visualizing device used when testing the performance of a super fine quantity oil lubricating pump.

FIGS. 19 and 20 are respectively schematic views of an embodiment in which the performance of the super fine quantity oil lubricating pump 5 was conducted. Here, description will be given of the results obtained by checking the influence of an air curtain on the nozzle 20 in the high-speed rotation of the spindle when the discharge state of the lubricating oil 25 was visualized by a CCD camera 56 and videotape recorded, the relationship of the pipe inside diameter and length with the discharge speed, and the relationship between the pipe inside diameter and discharge oil quantity, respectively. By the way, as the pipe material, there are used metal such as austenite stainless steel SUS 316, and plastics such as PEEK (polyether-ether-keton). However, there can also be used other material such as ordinary iron/steel material, aluminium/copper non-metallic material, plastic material, and ceramic material.

The present performance test was conducted under a severer condition (that is, under a condition that is easy to be influenced by the air curtain) by setting the distance between the nozzle leading end and the bearing as about 50 mm which is much longer than the normal distance (about 10 mm).

Supply of the lubricating oil to the interior portion of the bearing was set such that the lubricating oil can lubricate the contact portion between the inner race and rolling elements, while the lubricating oil supply state was visualized and was videotape recorded. A visualizing apparatus is composed of a strobe 55, a CCD camera 56, a control device 57 for controlling the strobe 55 and CCD camera 56, a videotape recorder 58 for recording video signals from the CCD camera 56, and a monitor 59 for displaying the images that have been recorded by the videotape recorder 58.

The visualizing apparatus was used to strobe observed the lubricating state in which the lubricating oil 25 was discharged from the nozzle 20. As the lubricating oil, there was used mineral oil VG22 (dynamic viscosity: 22 cSt at a temperature of 40° C.).

In this manner, the discharge state of the lubricating oil 25 was visualized and was tested under various conditions. As a result of this, it could be confirmed that the lubricating oil 25 can be supplied in a fine quantity by the super fine quantity lubricating pump 5 without being influenced by an air curtain which occurs in the interior portion of the bearing. Also, the optimum discharge condition could also be found out. Here, the discharge speed that is free from the influence of the air curtain occurring in the interior portion of the bearing was set equal to or more than 10% of the inner race shoulder peripheral speed based on previous results. For example, in a bearing with an outer race outside diameter of 160 mm, an inner race inside diameter of 100 mm, and a rolling element pitch circle diameter dm=132.5 mm, a peripheral speed at a position of the rolling element pitch circle diameter dm provides 131.8 m/sec. in the case of the rotational speed N=19000 rpm. That is, the discharge speed 13 m/sec., which is about 10% of the peripheral speed, provides a standard and, as this value is larger and the discharge quantity is larger, the discharge condition can be set more widely.

Figure 21:
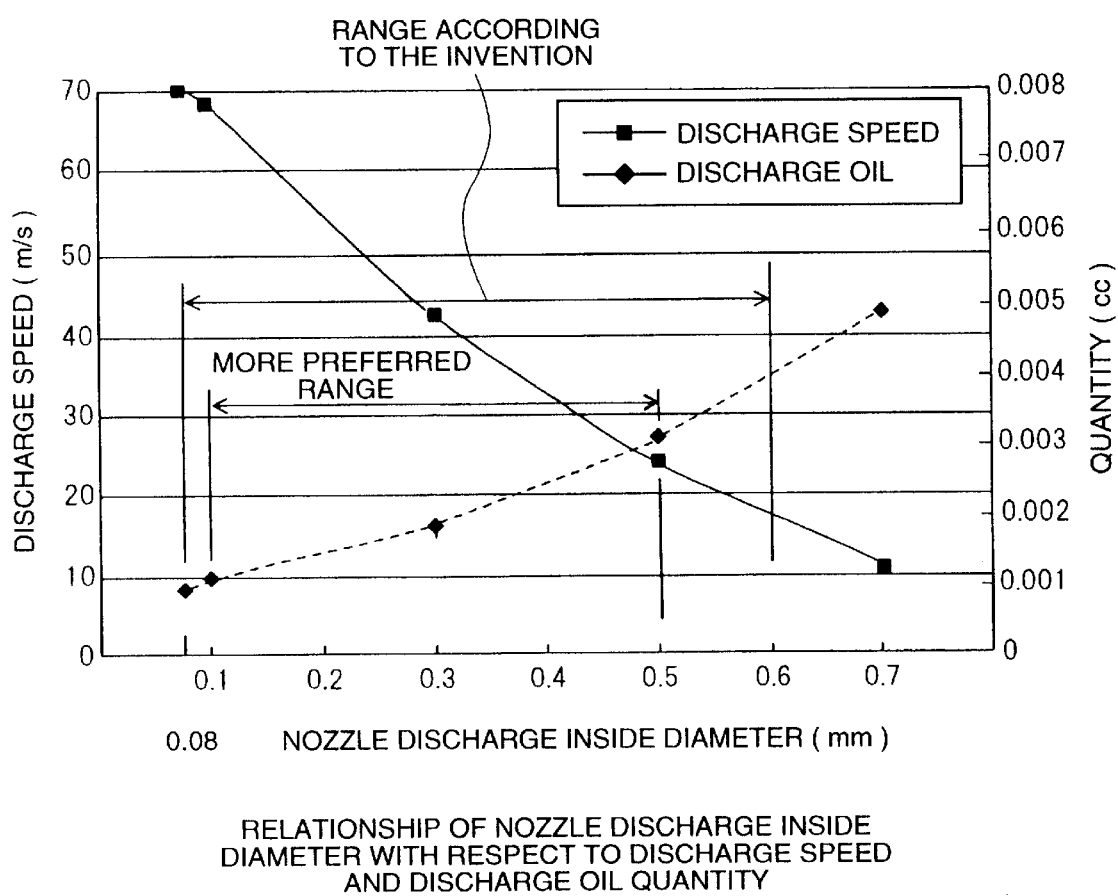
FIG. 21 is a graphical representation of the relationship between the discharge inside diameter of a nozzle outlet and discharge speed from a nozzle.
Figure 22:
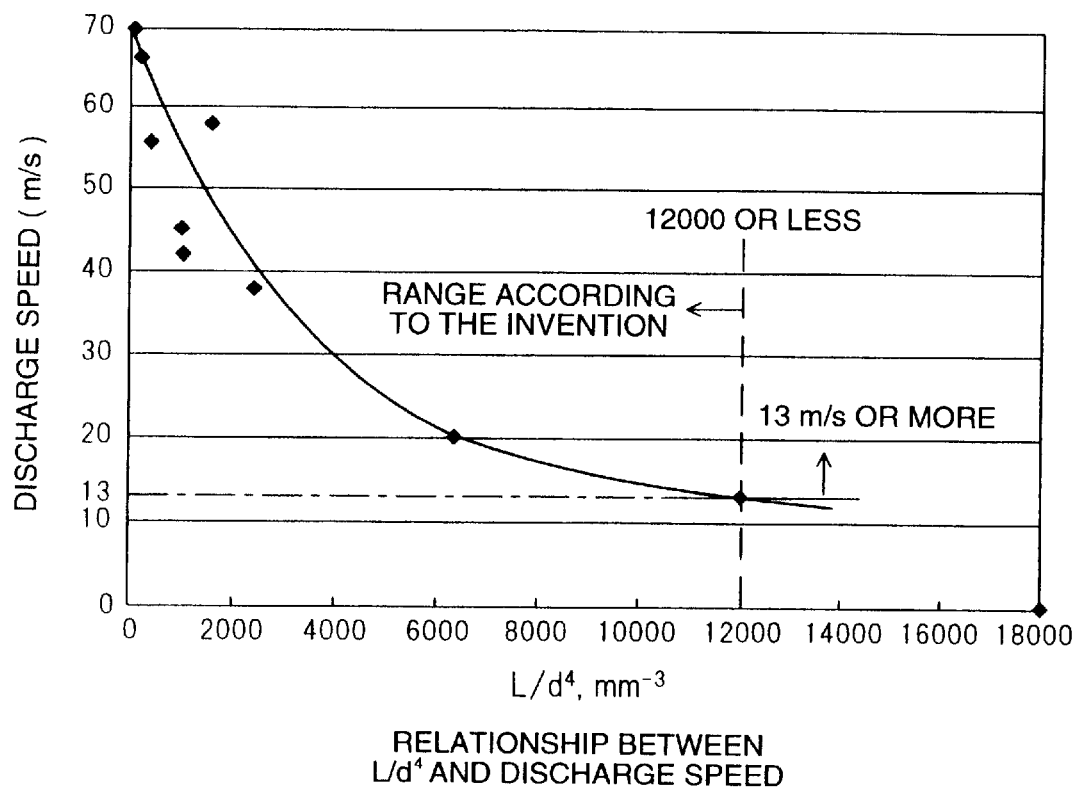
FIG. 22 is a graphical representation of the relationship between the parameter $L/d^4$ of pipe resistance and the speed of oil discharged.
Figure 23:
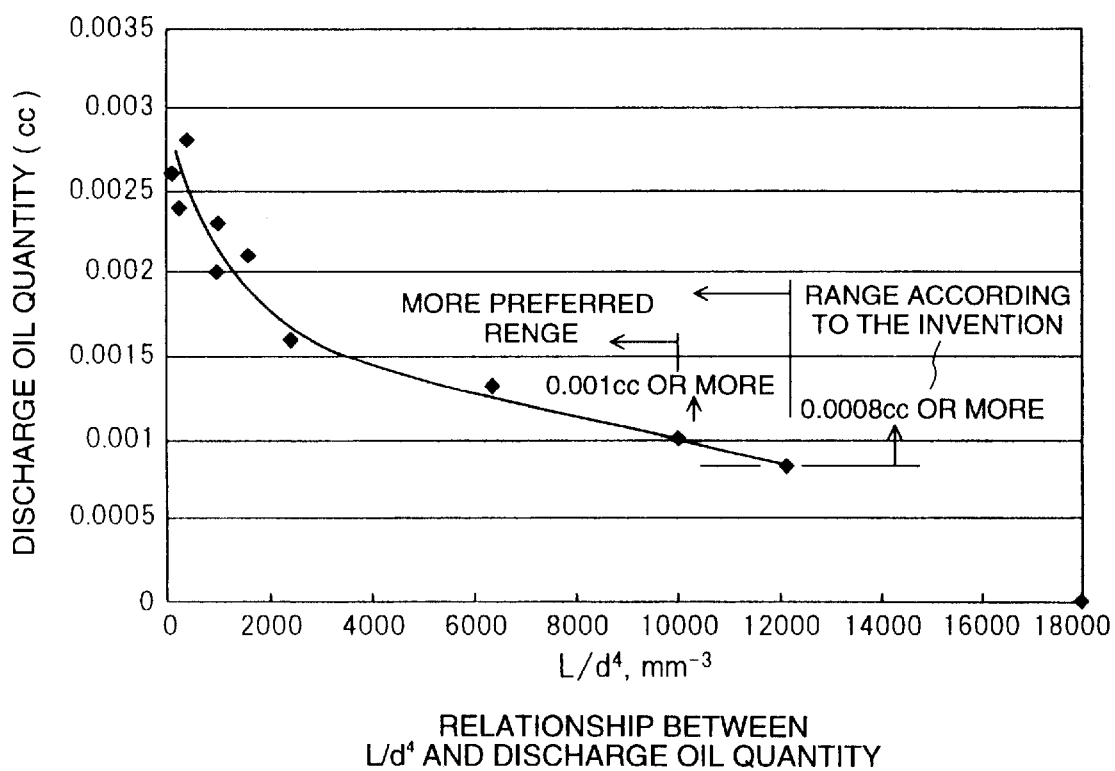
FIG. 23 is a graphical representation of the relationship between the parameter $L/d^4$ of pipe resistance and the quantity of oil discharged.

Now, FIGS. 21 to 23 respectively show the test results of the discharge state of the lubricating oil.

FIG. 21 is a graphical representation of the relationship between the discharge inside diameter of the nozzle 20 and the discharge speed, showing the results obtained by conducting the test with the discharge inside diameter of the nozzle as a parameter. As shown in FIG. 21, the smaller the discharge inside diameter of the nozzle is, the smaller the discharge quantity is and the larger the discharge speed is. And, as a result of the test, in case where the discharge diameter of the nozzle was smaller than 0.08 mm, variations in the discharge oil quantity increased; and, in the case of the nozzle discharge diameter being larger than 0.6 mm, the discharge speed showed an insufficient value which is equal to or less than 13 m/sec. Therefore, it is preferred that the effective range value of the discharge diameter of the nozzle may range from 0.08 to 0.6 mm. In this range, the lubricating oil is discharged at a discharge speed of 13–70 m/sec., and in a discharge oil quantity of 0.0008–0.004 cc per shot. Further, when balance between a discharge speed and a discharge oil quantity at a high speed is taken into account, it is especially preferred that the nozzle discharge diameter may be set in the range of 0.1–0.5 mm. In this case, the lubricating oil is discharged at a discharge speed of 25–68 m/sec., and in a discharge oil quantity of 0.001 cc–0.003 cc per shot.

Also, the discharge speed and discharge oil quantity are also influenced by the kinematic viscosity characteristic of lubricating oil; for example, in lubricating oil having a kinematic viscosity of 5 cSt–50 cSt at a temperature of 40° C., the discharge speed is in the range of 10 m/sec.–100 m/sec., while the discharge oil quantity is in the range of 0.0005 cc per shot–0.01 cc per shot.

Now, FIG. 22 show the results obtained when the discharge state of the lubricating oil 25 from the nozzle 20 was visualized and the discharge speed thereof was checked. Here, the respective discharge speeds, which were obtained when the pipe inside diameter d was set in the range of 0.5–1.5 mm and the pipe length L was set in the range of 100 mm–3000 mm, are graphically represented with the parameter $L/d^4$ of the pipe resistance as the abscissa. As can be seen from this graphical representation, in the case of $L/d^4 \leq 12000$ ($mm^{-3}$), the discharge speed is equal to or more than 13 m/sec., which satisfies the discharge speed required.

FIG. 23 is a graphical representation of the relationship between the parameter $L/d^4$ of the pipe resistance and the discharge oil quantity. As can be seen from this graphical representation, in the range of $L/d^4 \leq 12000$ ($mm^{-3}$), a fine oil quantity of 0.0008 cc/shot or more can be supplied; and, in the range of $L/d^4 \leq 10000$ ($mm^{-3}$), a fine oil quantity of 0.001 cc/shot or more can be supplied. Therefore, by combining L with d in the range of $L/d^4 \leq 12000$ ($mm^{-3}$), it is possible to set the discharge speed equal to or larger than 13 m/sec. and the discharge oil quantity equal to or larger than 0.0008 cc/shot. Further, in the range of $L/d^4 \leq 10000$ ($mm^{-3}$), it is possible to set the discharge speed equal to or larger than 13 m/sec. and the discharge oil quantity equal to or larger than 0.001 cc/shot. Also, $L/d^4$ is restricted by the fact that the pipe length cannot be shortened due to the condition of the apparatus and thus $L/d^4 \leq 5$ ($mm^{-3}$) is the practical range. In case where the pipe diameter is changed on the way, as d, there is used a mean diameter for the whole pipe length.

Next, a rotation test was conducted using a spindle apparatus according to the present embodiment; and, the performance of the angular ball bearing 16a when using the super fine quantity oil lubricating pump 5 was compared with the performance thereof when using a conventional oil-air lubricating system.

As the test bearing, there was used a bearing which has the following contents: that is, outer race outside diameter: 160 mm, inner race inside diameter: 100 mm, rolling element pitch circle diameter $d_m$: 132.5 mm, outer/inner race groove radius of curvature: 52–56% of the ball diameter, contact angle: 20 degrees, inner/outer race material: SUJ2, and rolling element material: $Si_3N_4$. And, under the conditions of lubricating oil: mineral oil VG22 (kinematic viscosity: 22 cSt at a temperature of 40° C.), axial load: 980N, nozzle number per bearing: in the case of the conventional oil-air lubrication, three nozzles and, in the case of the super fine quantity oil lubricating pump, one nozzle, and 0–15000 rpm (in part, 19000 rpm, $d_m \cdot N=2500000$), there were conducted tests respectively on the relationship between the spindle rotation speed and bearing torque, the relationship between the spindle rotation speed and outer race temperature increase, a comparison of bearing torque variations, a comparison of noise levels, and observation of visualization (videotape recorded images) of the state of the super fine quantity oil lubricating pump.

Figure 24:
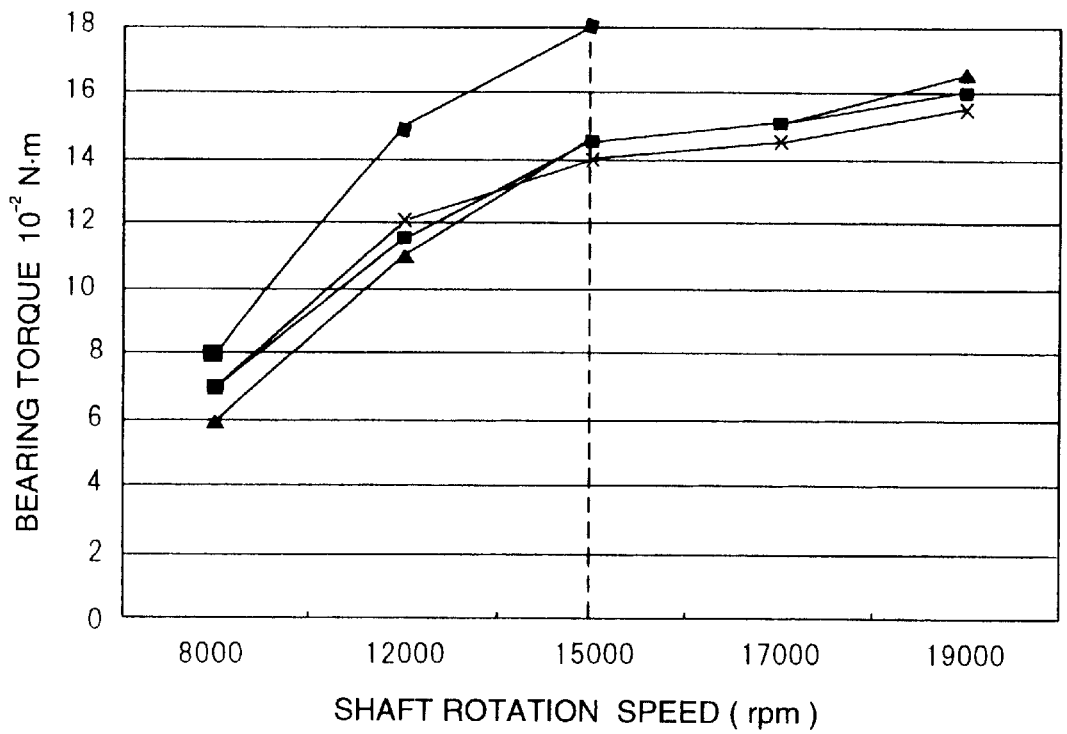
FIG. 24 is a graphical representation of the relationship between the rotation speed of the spindle and the torque of the bearing.

FIG. 24 is a graphical representation which shows the relationship between the spindle rotation speed and bearing torque. In FIG. 24, the oil-air lubricating system corresponds to the data obtained when three nozzles respectively discharge lubricating oil of 0.03 cc per shot at the interval of 8 min.; the super fine quantity oil lubricating system corresponds to the data obtained when one nozzle discharges lubricating oil of 0.002 cc per shot at the intervals of 10 sec., 40 sec., and 1 sec.; and, discharged oil quantities per unit time are respectively 0.01125 cc/min., 0.012 cc/min., 0.003 cc/min., and 0.12 cc/min.

In the conventional oil-air lubricating system, at the rotation speed of 15000 rpm ($d_m \cdot N=2000000$), the bearing torque is 0.18 N·m, whereas, in the super fine quantity oil lubricating system according to the invention, the bearing torque is 0.14 N·m which is lower than in the conventional system. Further, at the rotation speed of 19000 rpm ($d_m \cdot N=2500000$) as well, the bearing torque according to the invention is 0.16 N·m. That is, the apparatus according to the invention is lower in the bearing torque than the conventional apparatus.

From the torque characteristics shown in FIG. 24, in case where the supply oil quantity is in the range of 0.003 cc/min.–0.12 cc/min., the torque in the case of the super fine quantity oil lubrication, at a rotation speed equal to or higher than the rotation speed of 12000–15000 rpm, becomes smaller as the supply interval is shorter, that is, as the supply oil quantity per unit time is larger. This is because, in order that the lowering of the oil film forming performance due to an increase in the temperature at a high speed can be prevented, there is required a certain degree of lubricating oil quantity. That is, for the respective rotation speeds used, there are present the optimum lubrication oil quantity, the optimum lubricating oil supply interval, and the optimum discharge oil quantity. The optimum lubrication oil quantity, lubricating oil supply interval and discharge oil quantity at the highest rotation speed can also be set according to the highest rotation speed. However, in case where the lubricating oil quantity is large, in the low speed rotation, the bearing torque can be too large. In this case, it is preferable that the control device may supply the lubricating oil in such a manner that it selects the optimum lubrication oil quantity, lubricating oil supply interval and discharge oil quantity to each of the rotation speeds.

By the way, in the case of the cylindrical roller bearing 17, not only because there is no spin as in the angular ball bearing but also because the contact surface pressure thereof is smaller than the angular ball bearing, even when the supply oil quantity is small, the bearing 17 can keep its oil film forming performance, while a range of 0.0005 cc/min.–0.12 cc/min. is the optimum condition of the supply oil quantity.

Figure 25:
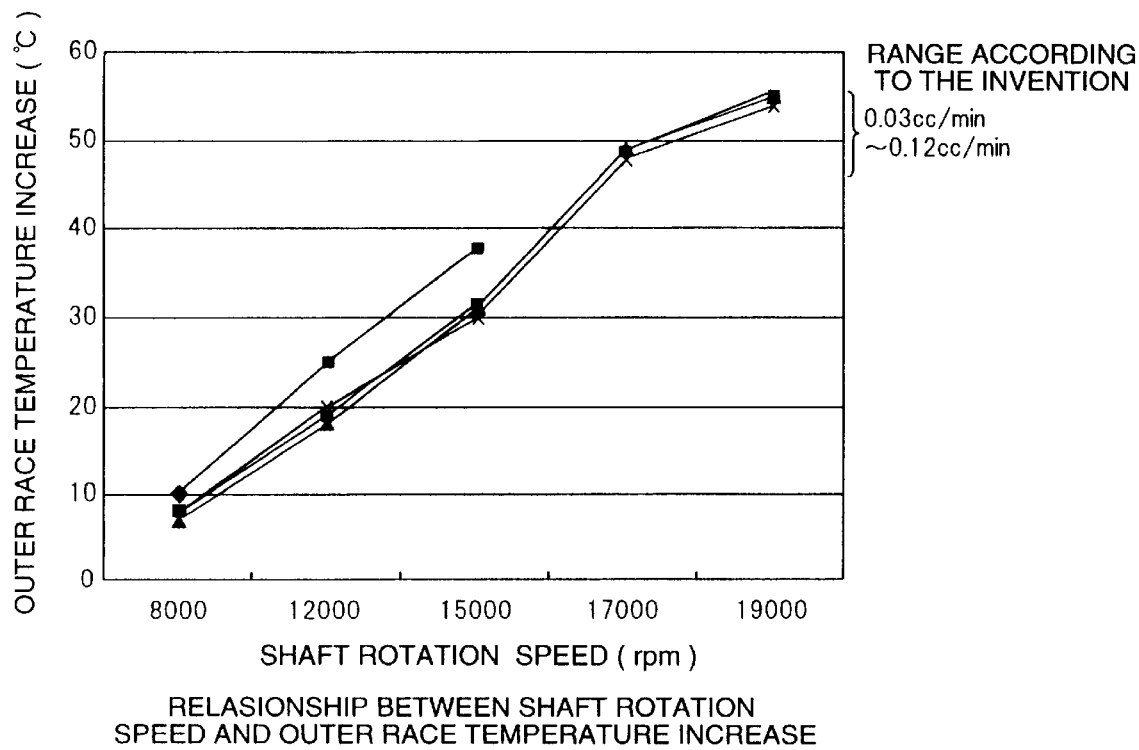
FIG. 25 is a graphical representation of the relationship between the rotation speed of the spindle and increases in the temperature in the outer race of the bearing.

Next, FIG. 25 is a graphical representation of the relationship between the spindle rotation speed and outer race temperature increase.

As can be seen from this graphical representation, with respect to the outer race temperature increase, the super fine quantity oil lubricating system is low in temperature when compared with the conventional oil-air lubricating system. In the present FIG. 25 and in the previous FIG. 24, in the case of the oil-air lubricating system, there are shown only the data up to the rotation speed of 15000 rpm. This is because, when the temperature was increasing into the range of 15000 rpm–17000 rpm, the gradient of the temperature increase was steep and the outer race temperature increase exceeds 60° C., so that the test was interrupted. That is, when compared with the conventional oil-air lubricating system, the super fine quantity oil lubricating system produces less torque, can restrict the temperature increase, and can rotate the spindle at a high speed. By the way, in case where, in the low speed rotation, the bearing temperature and torque increase due to the excessive supply of the lubricating oil provides a problem, as a countermeasure against this, in the case of the super fine quantity lubricating oil pump 5, it is able to control lubricating oil supply quantity.

Next, FIG. 26 is a graphical representation of the results obtained by checking the changes of the bearing torque and bearing temperature when the lubricating oil is supplied. Here, in the oil-air lubricating system of FIG. 26A, there are shown data obtained when three nozzles respectively discharged the lubricating oil in a quantity of 0.03 cc per shot at the intervals of 8 min., a total of 0.01125 cc/min. And, in the super fine quantity oil lubricating system of FIG. 26B, there are shown the data obtained when a single nozzle discharged the lubricating oil in a quantity of 0.002 cc of per shot at the interval of 10 sec., a total of 0.012 cc/min.

In the conventional oil-air lubricating system, the three nozzles respectively supply the lubricating oil in a quantity of 0.03 cc per shot at the intervals of 8 min. However, as shown in FIG. 26A, after the lubricating oil is supplied, the bearing torque varies outstandingly and, in response to this, the bearing temperature increases. On the other hand, in the super fine quantity oil lubricating system, although the lubricating oil quantity per unit time is almost equal to the conventional oil-air lubricating system, the supply oil quantity per shot is extremely small and the supply interval is short, so that the bearing torque and bearing temperature vary in such a slight manner that the oil supply time cannot be distinguished.

Figure 27:
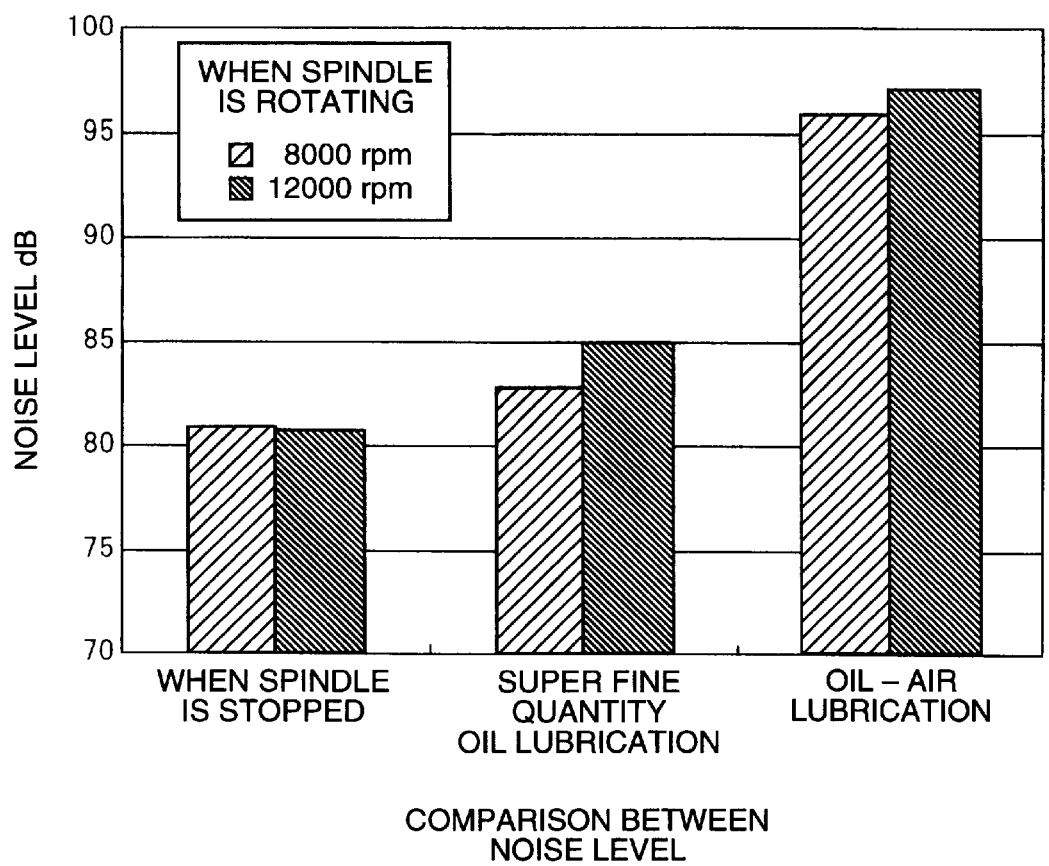
FIG. 27 is a graphical representation of a comparison of noise levels between a super fine quantity lubricating oil pump according to the invention and a conventional device; and, FIG. 28 is a section view of a super fine quantity lubricating oil pump employed in a spindle apparatus according to a second embodiment of the invention.

Next, FIG. 27 is a graphical representation of the results obtained by comparing the noise levels of the super fine quantity oil lubricating pump according to the present embodiment with those of the conventional device. The lubricating conditions in this comparison are also the same as in FIGS. 26A and 26B. As can be seen from this graphical representation, in the spindle apparatus according to the present embodiment, since there is not used compressed air, the noise level thereof is low when compared with the conventional oil-air lubricating system.

As has been described heretofore in detail, according to the spindle apparatus of the present embodiment, since there is provided the super fine quantity oil lubricating pump 5 and the angle and position of the nozzle 20 are designed optimally, the lubricating oil 25 can be pin-spot supplied in a super fine quantity (0.0005–0.01 cc/shot) directly to a desired portion within the bearing at the intervals of dozens of seconds.

Also, because the discharge speed (10–100 m/sec.) from the nozzle 20 is fast, the lubricating oil 25 can be supplied to the interior portion of the bearing accurately without being influenced by the air curtain which can occur when the spindle apparatus rotates at a high speed.

And, since the lubricating oil supply interval and lubricating oil quantity can be changed by the control device in accordance with the rotation speeds, the lubricating oil can be always supplied in a proper quantity for the rotation of the spindle regardless of the spindle rotation speed.

This can always provide an ideal lubricating condition in the interior portion of the bearing, which in turn makes it possible to provide a structure which is very excellent in torque stability. Also, an increase in the bearing temperature can also be controlled to a low level. Further, since the lubricating oil 25 is positively supplied to the interior portion of the bearing, there can be obtained a good lubricating oil supply efficiency and the quantity of consumption of the lubricating oil can be reduced. Therefore, the super fine quantity oil lubricating system allows rotation up to a higher speed area than that in the conventional oil-air lubricating system.

Also, because no compressed air is used, the noise level is low and an oil mist can occur little. And, since the lubricating oil discharge sensor and nozzle clogging sensor are built into the main body of the apparatus, the occurrence of a trouble can be avoided.

To sum up the above facts, by using the super fine quantity oil lubricating system, a lubricating oil forced lubricating device, a heat exchanger, a lubricating oil collecting device, and other attendant devices such as compressed air, which are used in the conventional lubricating systems including an oil mist lubricating system, an oil-air lubricating system and a jet lubricating system, can be simplified; the noise level can be controlled down to a low level; the consumption of the lubricating oil can be reduced to thereby be consideration for the environment; the bearing torque can be reduced down to a low torque level and can be enhanced in stability; and, the bearing temperature increase can be controlled down to a low level, thereby being able to enhance the rotation accuracy of the spindle. Therefore, according to the present super fine quantity oil lubricating system, there can be provided a spindle apparatus which is more advantageous and more compact than a spindle apparatus using the conventional lubricating methods.

By the way, in the present embodiment, in the super fine quantity lubricating oil pump 5, there is used a giant magnetostrictive element. However, the giant magnetostrictive element is not limitative but, even in other super fine quantity lubricating systems respectively using a piezo-electric element or a combination of an electromagnet and a belleville spring, provided that the lubricating oil is discharged in a fine quantity of 0.0005–0.01 cc/shot is discharged at the discharge speed of 10–100 m/sec., a spindle apparatus is able to obtain a rotation performance equivalent to the spindle apparatus using the giant magnetostrictive element.

Also, besides the giant magnetostrictive material having a positive characteristic, even magnetostrictive material having a positive and negative characteristic can also be similarly used to form a pump which uses the expansion and contraction of the rod body.

Further, the use of the above-mentioned lubricating device is not limited to the spindle apparatus shown in FIG. 1, but it can also be used in a spindle apparatus of high speed rotation which is required to be small in various torque variations and temperature increase.

Second Embodiment

Next, description will be given below of a second embodiment of a spindle apparatus including a super fine quantity lubricating oil pump composed of an electromagnet and a belleville spring according to the invention. By the way, a structure employed in the present embodiment is similar to that of the spindle apparatus according to the first embodiment except for a lubricating device, and thus the duplicate description thereof is omitted here.

In the case of a super fine quantity lubricating oil pump according to the first embodiment, as a drive source for driving a piston which is used to increase the pressure within a pressurizing chamber (pump chamber), as shown in FIG. 3, there is used the rod-shaped giant magnetostrictive material. As the material of this rod-shaped body, piezo-electric element can also be used depending on the lubricating conditions. A magnetic field or a voltage is applied to the giant magnetostrictive material or piezo-electric element which is connected to the piston 35 to thereby strain the giant magnetostrictive material or piezo-electric element, the giant magnetostrictive material or piezo-electric element is pressed against the piston 35 due to its strain to thereby increase the pressure within the pressurizing chamber (pump chamber) 37, whereby a super fine quantity of lubricating oil is discharged intermittently from the nozzle. Here, to obtain desired discharge speed and discharge oil quantity, there is required a given strain quantity of the rod body. For example, in case where the desired discharge speed and discharge oil quantity of lubricating oil discharged from a nozzle, which is connected to a pump and having an opening with an inside diameter of 0.1 mm, are respectively set approximately in the range of 10–100 mm/sec. and of the order of 0.0005–0.01 cc/shot, there is required giant magnetostrictive material which is formed in a cylindrical shape and has an outside diameter: 12 mm and a length: about 100 mm (the rod body produces a strain of about 100 $\mu$m, while the strain of the giant magnetostrictive material is about 1000 ppm.

Now, in the present embodiment, instead of the element formed of the magnetostrictive material or piezo-electric element, an electromagnet and a spring are used to drive a piston, thereby being able to provide a structure which is reduced in both size and cost.

Figure 28:
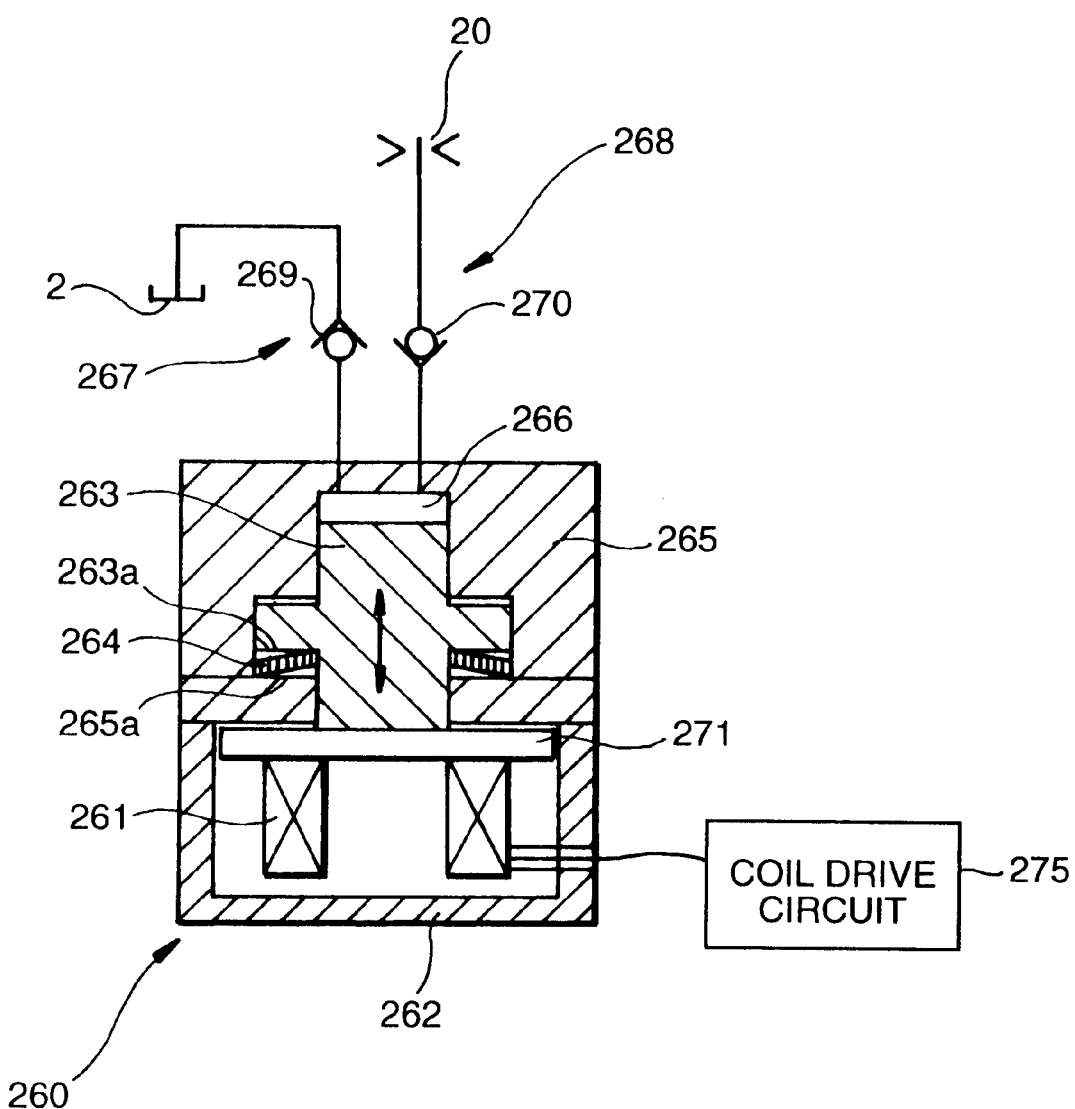

FIG. 28 is a section view of a super fine quantity lubricating oil pump 260 employed in a spindle apparatus according to the second embodiment of the invention. As shown in FIG. 28, the super fine quantity lubricating oil pump 260 comprises an electromagnet 261, a first housing 262 for storing the electromagnet 261 therein, a movable body (piston) 263 including a collar in the cylindrical-shaped intermediate portion thereof, and a second housing 265 for storing the movable body and a movable body pressing belleville spring 264 therein; and, the super fine quantity lubricating oil pump 260 further includes a pressurizing chamber 266 interposed between the movable body 263 and the second housing 265, a suction-side flow passage 267 and a discharge-side flow passage 268 respectively communicating with the pressurizing chamber 266, and check valves 269 and 270 respectively disposed on the suction-side flow passage 267 and discharge-side flow passage 268.

In the above-structured super fine quantity lubricating oil pump 260, the belleville spring 264, which is used to push out the movable body 263 to the pressurizing chamber 267 side, is interposed between the collar end face 263a of the movable body 263 and the end face 265a of the second housing 265. The movable body 263, when a current is supplied to the coil of the electromagnet 261 from a coil drive circuit 275, can be attracted toward the electromagnet 261 side and can be thereby contacted with an electromagnet portion 271 formed within the first housing 262. In this state, since the belleville spring 264 is contracted, there is generated a compression force.

After then, in case where the supply of the current from the control device 275 is cut off, the attracting force of the electromagnet 261 disappears and the movable body 263 is pushed out toward the pressurizing chamber 266 side due to the repulsive force of the belleville spring 264. As a result of this, the pressurizing chamber 266, in which the lubricating oil 25 is stored, is pressurized so that the lubricating oil 25 stored within the pressurizing chamber 266 is discharged from the nozzle 20 through the check valve 270 on the discharge-side oil passage 268. At the then time, the belleville spring 264 is adjusted in the clearance thereof in such a manner that it can be used in the 10–60% area of the whole flexing quantity of the belleville spring 264.

On the other hand, in the suction process, by supplying a current to the coil of the electromagnet 261 from the control device 275, there is generated a magnetic field in the electromagnet 261, so that the movable body 263 is attracted by the magnetic field. As a result of this, the pressurizing chamber 266 is expanded and thus the lubricating oil 25 is sucked in from the lubricating oil tank 2 through the check valve 269 on the suction-side flow passage 267. Also, as the movable body 263 is attracted, the belleville spring 264 is contracted to thereby generate a compression force which can generate such a pressuring chamber pressure as can obtain a desired discharge speed.

By repeating the above-mentioned suction and discharge operations, the lubricating oil 25 is discharged intermittently from the nozzle 20. Also, the electromagnet 261 is formed of a ferromagnetic body and, of course, the attracting force of the electromagnet 261 is set larger than the compression force that is generated by the contraction of the belleville spring 264.

In the present embodiment, assuming that, for the nozzle diameter of 0.1 mm, the discharge speed is set of the order of 60 m/sec., the discharge oil quantity is set 0.006 cc per shot, the pressure of the pressurizing chamber 266 is set on the order of 4 MPa, the outside diameter of the movable body 263 in the pressurizing chamber portion is set 10 mm, and the movable body stroke length is set 80 $\mu$m, as the belleville spring 64, there may be used a belleville spring for a heavy load which has a nominal size of 12 or larger, which is under the classification of JIS B 2706.

Also, when designing generally the electromagnet 261 suitable for this arrangement, the dimensions of the electromagnet portion lets thereof are set such that outside diameter: 50 mm and length: about 40 mm; and, the size of the movable portion drive mechanism portion is about 40% of that obtained when the giant magnetostrictive element according to the first embodiment is used, so that the electromagnet 261 can be made compact. Also, to drive the electromagnet 261, a small power of a direct current having 6 V and about 0.1 A may be supplied. Therefore, in case where the electromagnet 261 is designed in this manner, the present embodiment can have the same function as the first embodiment as well as can reduce the size and cost of the spindle apparatus. Also, in case where a mechanically-operated movable stopper mechanism is disposed in the spindle apparatus, the power supply to the electromagnet 261 may be executed only when contracting the movable body 263, which can save the power consumption as well.

By the way, in the present embodiment, although no pipe is connected to the spindle apparatus, in case where a pipe is connected, a pipe to be connected, provided it has an inside diameter of about 1 mm and a length of 2 m or less, is sufficiently able to fulfill such performance as about 50% of the above-mentioned discharge speed.

In this manner, the super fine quantity lubricating oil pump 260 employed in a spindle apparatus according to the present embodiment, using the compression force to be generated by compressing the belleville spring 264, drives the movable body 263 disposed within the cylinder to compress the capacity of the pressurizing chamber 266 to thereby discharge the lubricating oil 25 and, on the other hand, in order to return the movable body 263, the attracting force of the electromagnet 261 is used. Since the super fine quantity lubricating oil pump 260 does not use expensive elements such as magnetostrictive material and piezo-electric element but uses the belleville spring and electromagnet, the spindle apparatus can be manufactured at a low cost and simply, so that the size and cost thereof can be reduced.

By the way, the super fine quantity lubricating oil pumps 5 and 260 respectively employed in the spindle apparatus according to the above-mentioned first and second embodiments can also be suitably applied to, for example, a machining center of which high precision and high-speed rotation are required.

Also, in the first embodiment, by detecting the coil current, the abnormal condition and air bleed completion can be judged. However, the abnormal condition and air bleed completion can also be detected by the following methods:

(1) A voltage value proportional to a current value is detected by measuring the voltage drop of a detecting resistance using a voltage meter and the current value is detected based on the thus obtained voltage value.

(2) The intensity of a magnetic field proportional to a current value is measured using a Hall element and the current value is detected based on the thus obtained magnetic field value. In this case, the Hall element may preferably be disposed in the vicinity of the rod body, which makes it possible to detect the expansion and contraction operation of the rod body more directly, thereby being able to enhance the measuring accuracy.

(3) A pressure sensor is installed within a cylinder and the pressure of the interior portion of the cylinder is detected by the pressure sensor.

(4) Using a displacement meter for measuring the displacement of a piston, the displacement quantity is detected.

(5) Using a vibration sensor, vibrations in accordance with the reactive force of a piston are detected.

Also, as the other use of the spindle apparatus according to the first and second embodiments, for example, there is available the supply of cutting oil in semi-dry work.

According to the spindle apparatus of the invention, since it includes a super fine quantity oil lubricating pump, a lubricating oil forced circulating device, a heat exchanger, a lubricating oil collecting device, and other attendant facilities such as compressed air, which are used in the conventional lubricating systems such as an oil mist lubricating system, oil-air lubricating system and jet lubricating system, can be simplified; and, the noise level can be controlled down to a low level, the lubricating oil consumption can be reduced to thereby be consideration for the environment, the bearing torque stability can be enhanced, and the bearing temperature increase is small, thereby being able to enhance the rotation accuracy of the spindle.

What is claimed is:

1. A spindle apparatus, comprising:
    a shaft;
    at least two bearings disposed spaced apart from each other in the axial direction of the shaft, the bearings respectively having inner races fitted with the shaft;
    a housing fined with outer races of the bearings, so that the inner races and the outer races are rotatable with respect to each other via rolling elements of the bearings; and,
    a lubricating device supplying a lubricant at a discharge speed of 10 m/sec.–100 m/sec. and in a discharge oil quantity of 0.0005 cc/shot–0.01 cc/shot via a nozzle, wherein said lubricant is intermittently supplied, and wherein said lubricating device comprises a nozzle which discharges a lubricant in a quantity of 0.003 cc/min.–0.12 cc/min. to the bearings.

2. A spindle apparatus as set forth in claim 1, wherein said lubricating device comprises:

a pump for pressurizing said lubricant;

a check valve disposed in the intermediate portion of a flow passage for supplying said lubricant to said pump for preventing said lubricant from flowing out of the pump; and said nozzle is disposed on the lubricant discharge side of said pump and having a flow passage sectional area smaller than the lubricant flow passage sectional area of said check valve.

3. A spindle apparatus as set forth in claim 1, wherein said pump is a magnetostrictive pump, comprising:

a rod body formed of magnetostrictive material and expandable and contractible by applying a magnetic field to said rod body and removing said magnetic field from said rod body; and, a pump chamber for pressurizing said lubricant by means of the expanding and contracting operations of said rod body.

4. A spindle apparatus as set forth in claim 3, wherein said rod body is fixed on one end side thereof, and said pump chamber comprises:

a piston connected on the other end of said rod body; and, a cylinder in which said piston is slidably disposed, the cross sectional area of the inner surface of said cylinder being set smaller than the cross sectional area of said rod body.

5. A spindle apparatus as set forth in claim 3, wherein the decreased capacity of said pump chamber caused by the expansion of said rod body is set equal to the sum of the quantity of the air flowing into said pump chamber from said nozzle when said rod body is contracted, a decreased volume caused by the compression of the lubricant existing within an internal capacity defined between said check valve and the outlet of said nozzle, the increased capacity of said internal capacity caused by the pressure deformation of said rod body and a pipe for communicating said nozzle with said pump defining said internal capacity, and a required discharge quantity of said lubricant.

6. A spindle apparatus as set forth in claim 3, wherein said magnetostrictive pump comprises:

a coil applying a magnetic field; and, a control device controlling a current to be supplied to said coil so as to expand and contract said rod body, and wherein said control device, in the initial excitation stage of said coil, supplies the current until said lubricant existing within said pump chamber reaches such a pressure as to allow said magnetostrictive pump to obtain a desired discharge speed, after reaching said pressure, said control device supplies the current so as to maintain the pressure of said lubricant constant according to the discharge quantity of said lubricant, and further, after a desired lubricant discharge quantity is obtained, said control device cuts off the supply of said current.

7. A spindle apparatus as set forth in claim 3, wherein said magnetostrictive pump comprises:

a coil applying a magnetic field; and, a control device controlling a current to be supplied to said coil so as to expand and contract said rod body, and wherein said lubricating device further includes:

a measuring device measuring any one of the value of a current to be supplied to said coil, a voltage value proportional to said current, and the value of a magnetic flux caused by said current; and, an abnormal condition judging device comparing the measured value with respect to an elapsed time measured by said measuring device with a measured value in a normal condition to thereby judge whether an abnormal condition has occurred or not, and when said abnormal condition judging device judges that an abnormal condition has occurred, said lubricant device issues an abnormal condition signal.

8. A spindle apparatus as set forth in claim 3, wherein said magnetostrictive pump comprises:

a coil applying a magnetic field; and, a control device controlling a current to be supplied to said coil so as to expand and contract said rod body, and wherein said lubricating device further includes:

a measuring device for measuring any one of the value of a current to be supplied to said coil, a voltage value proportional to said current, and the value of a magnetic flux caused by said current; and, an air mixture judging device comparing the measured value with respect to an elapsed time measured by said measuring device with a measured value in an air non-mixture condition to thereby judge whether the air is mixed or not, and until said air mixture judging device judges in the start of the operation of said lubricating device that the air is not mixed, said control device increases said current to be supplied to said coil or increases the supply frequency of said current.

9. A spindle apparatus as set forth in claim 1, wherein said pump comprises:

a rod body formed of piezo-electric element and expandable and contractible by applying a voltage to said rod body and removing said voltage from said rod body; and, a pump chamber pressurizing said lubricant by means of the expanding and contracting operations of said rod body.

10. A spindle apparatus as set forth in claim 1, wherein said pump comprises:

an electromagnet;

a movable body reciprocatable linearly due to the attraction by said electromagnet; and, a pump chamber pressurizing said lubricant by means of the reciprocating motion of said movable body.

11. A spindle apparatus as set forth in claim 1, wherein the discharge diameter of said nozzle is 0.08 mm–0.6 mm.

12. A spindle apparatus as set forth in claim 11, wherein the discharge diameter of said nozzle is 0.1 mm–0.5 mm.

13. A spindle apparatus as set forth in claim 1, further including a pump for pressuring said lubricant; and a pipe for communicating said nozzle with said pump, wherein said pipe is formed such that a ratio of the length L of said pipe to the inside diameter d thereof is 5 $mm^{-3} < L/d^4 < 12000$ $mm^{-3}$.

14. A spindle apparatus as set forth in claim 13, wherein said pipe is formed such that a ratio of the length L of said pipe to the inside diameter d of said pipe is 5 $mm^{-3} \leq L/d^4 \leq 1000$ $mm^{-3}$.

15. A spindle apparatus as set forth in claim 1, wherein the supply quantity and supply interval of said lubricant discharged from said lubricating device are controlled according to the rotation speed of the relative rotation between said housing and said shaft.

* * * * *